US012710858B2

(12) United States Patent
Murayama

(10) Patent No.: US 12,710,858 B2
(45) Date of Patent: Aug. 18, 2026

(54) INFORMATION GENERATION APPARATUS FOR GENERATING AND CORRELATING ELECTRONIC STICKY NOTES, AND INFORMATION GENERATION METHOD AND STORAGE MEDIUM FOR SAME

(71) Applicant: CASIO COMPUTER CO., LTD., Tokyo (JP)

(72) Inventor: Yoichi Murayama, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 124 days.

(21) Appl. No.: 18/520,671

(22) Filed: Nov. 28, 2023

(65) Prior Publication Data

US 2024/0211111 A1 Jun. 27, 2024

(30) Foreign Application Priority Data

Dec. 22, 2022 (JP) ................................ 2022-205522
Dec. 22, 2022 (JP) ................................ 2022-205525

(51) Int. Cl.
*G06F 3/0483* (2013.01)
*G06F 3/04842* (2022.01)

(52) U.S. Cl.
CPC ........ *G06F 3/0483* (2013.01); *G06F 3/04842* (2013.01)

(58) Field of Classification Search
CPC ........................... G06F 3/0483; G06F 3/04842
See application file for complete search history.

(56) References Cited

U.S. PATENT DOCUMENTS 10,013,408 B2 7/2018 Nakamori et al.
10,817,148 B2 10/2020 Akae et al.
(Continued)

FOREIGN PATENT DOCUMENTS

JP 2007334754 A 12/2007
JP 2015087789 A 5/2015
(Continued)

OTHER PUBLICATIONS

Japanese Office Action (and an English language translation thereof) dated Mar. 31, 2026, issued in corresponding Japanese Application No. 2022-205522.

*Primary Examiner* — Nicholas Ulrich
(74) *Attorney, Agent, or Firm* — Holtz, Holtz & Volek PC

(57) ABSTRACT

A control unit of an information generation apparatus performs: correlating a plurality of electronic sticky notes that satisfy a designated condition to each other among a plurality of electronic sticky notes displayed in a display area of a designated group and displaying the correlated electronic sticky notes; and in a case where the correlating process is performed on a first group of a plurality of groups, if an electronic sticky note that satisfies the designated condition is included in a second group differing from the first group, a control process of causing a duplicate electronic sticky note obtained by duplicating an electronic sticky note that satisfies the designated condition included in the second group to be displayed in a display area of the first group, and correlating the plurality of electronic sticky notes that satisfy the designated condition that includes the duplicate electronic sticky note to each other.

18 Claims, 13 Drawing Sheets

(56) References Cited

U.S. PATENT DOCUMENTS

| | | | | |
|---|---|---|---|---|
| 2015/0121191 | A1* | 4/2015 | Nakamori | G06F 40/169 715/230 |
| 2018/0314882 | A1* | 11/2018 | Yu | G06Q 10/10 |
| 2021/0208775 | A1* | 7/2021 | Allington | G06F 3/0486 |
| 2021/0303769 | A1* | 9/2021 | Ono | G06T 11/206 |
| 2022/0108276 | A1* | 4/2022 | Stringham | G06F 9/451 |
| 2023/0195760 | A1* | 6/2023 | Ellsworth | G06F 3/04812 715/243 |

FOREIGN PATENT DOCUMENTS

| | | | |
|---|---|---|---|
| JP | 2016173626 | A | 9/2016 |
| JP | 2019061504 | A | 4/2019 |
| JP | 2021149296 | A | 9/2021 |
| JP | 2021152731 | A | 9/2021 |
| JP | 2022137863 | A | 9/2022 |

* cited by examiner (12d)

User ID: NB1 (NB2, NB3, …)

| | | | | |
|---|---|---|---|---|
| Sticky note ID | | NB1-1 | NB1-2 | NB1-3 |
| Types | | Text | Text | Dictionary |
| Attributes | | ・Time and date of creation/edit<br>・Data setting information<br>・Sub-attributes/… | ・Time and date of creation/edit<br>・Data setting information<br>・Sub-attributes/… | ・Time and date of creation/edit<br>・Data setting information<br>・Sub-attributes/… |
| Coordinate (x,y) | | (50,100) | (300,200) | (50,450) |
| Size (w,h) | | (200,200) | (200,200) | (200,200) |
| Connection opening/closing flag (Open: 1/Close: 0) | | 1 | 1 | – |
| Connected sticky note ID | Connection destination | NB1-2 | – | – |
| | Connection origination | – | NB1-1 | – |

FIG. 3

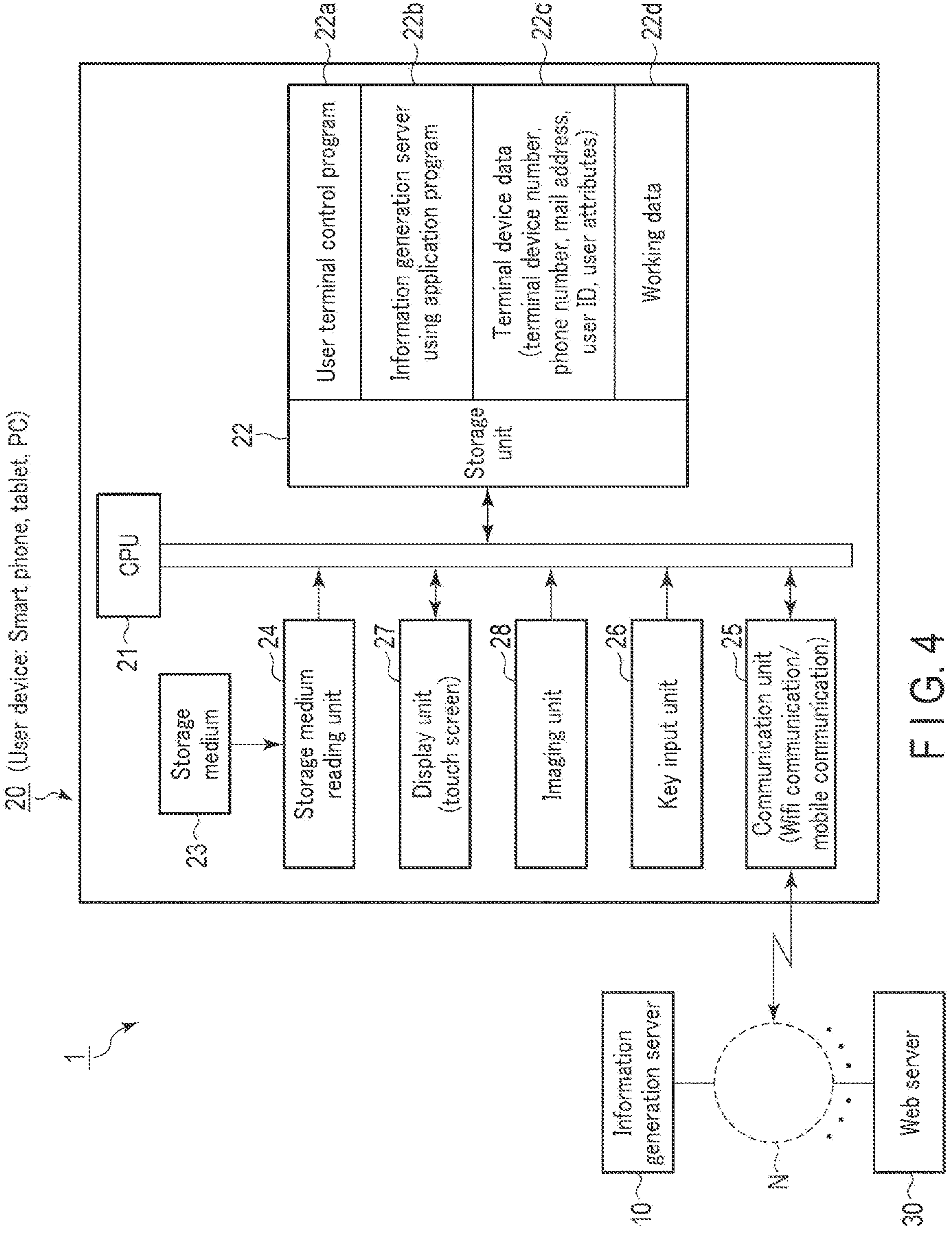
F I G. 4

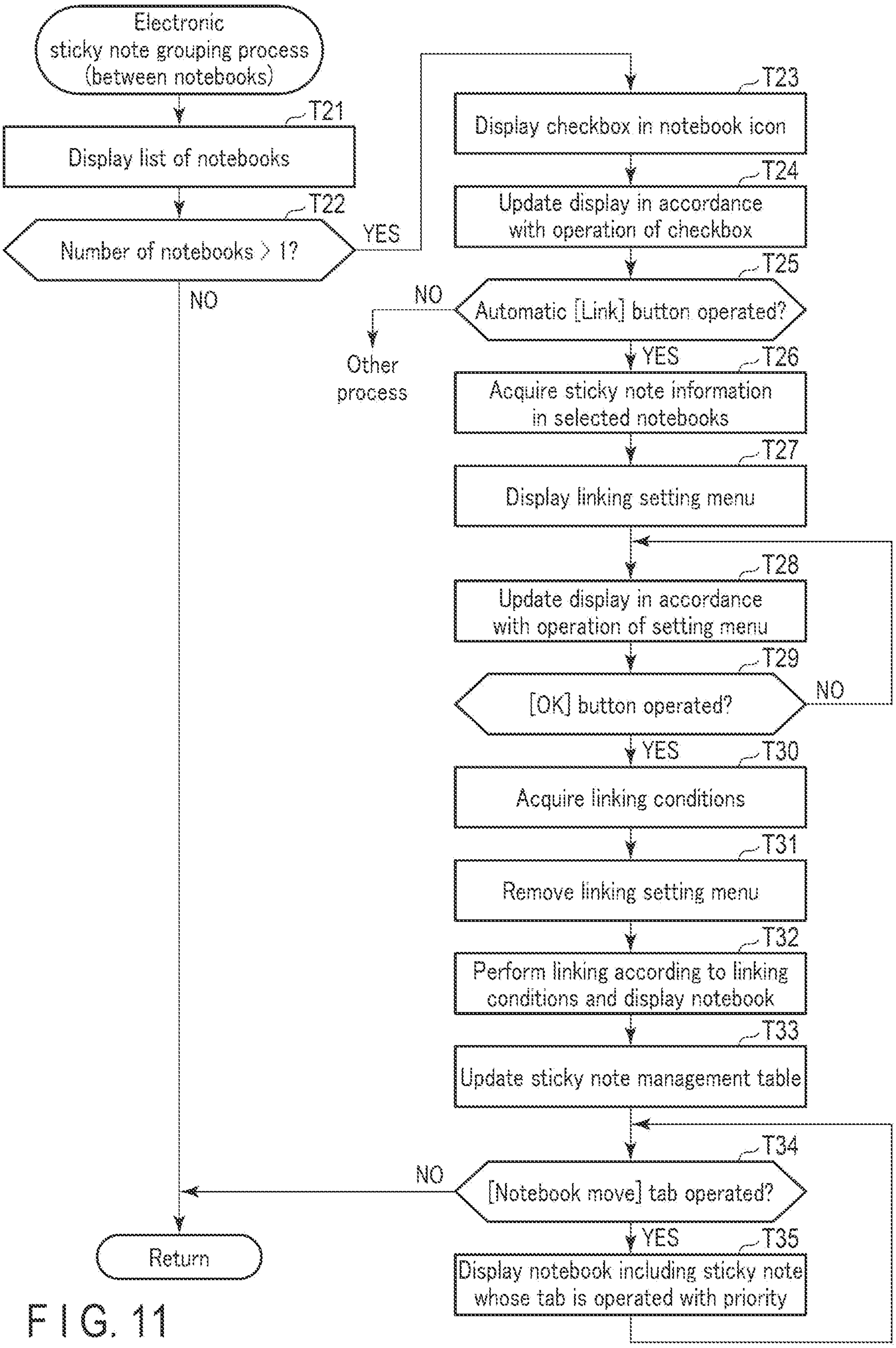
F I G. 11

MN
G2
27
NB1
LT
Store
Tx
Ca
Li
Fi
Di
Ma
Text
Camera
Link
File
Dictionary
Mathematical tool
NB1-1
てきすと
NB1-2
text
NB1-3
原文・本文
NB1-4
NB1-5
$y=x^2$
0

(A)

MN
G2
27
NB2
LT
Store
Tx
Ca
Li
Fi
Di
Ma
Text
Camera
Link
File
Dictionary
Mathematical tool
NB2-1
テキスト
NB2-2
TOP 2022
NB2-3

(B)

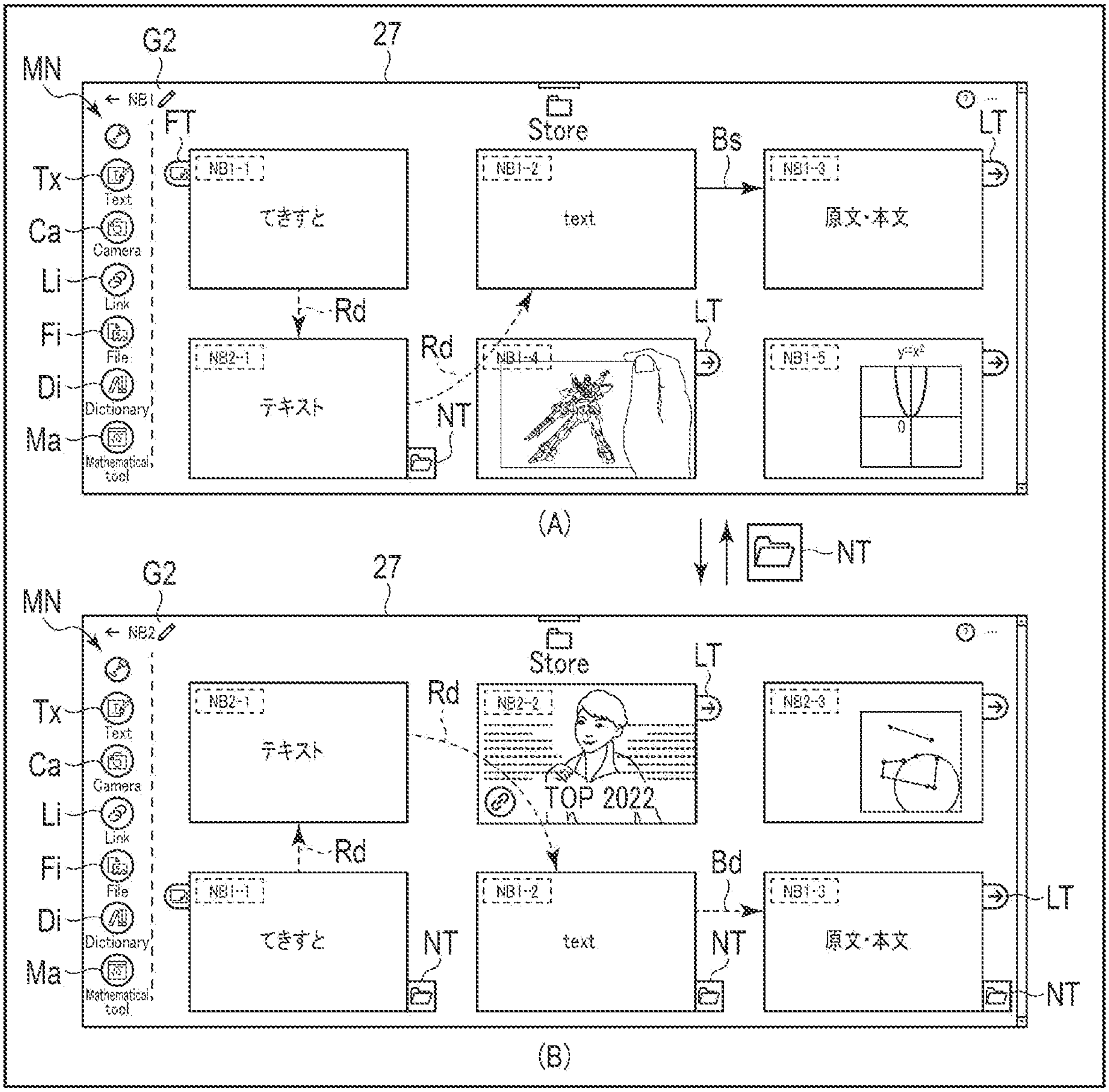
F I G. 14

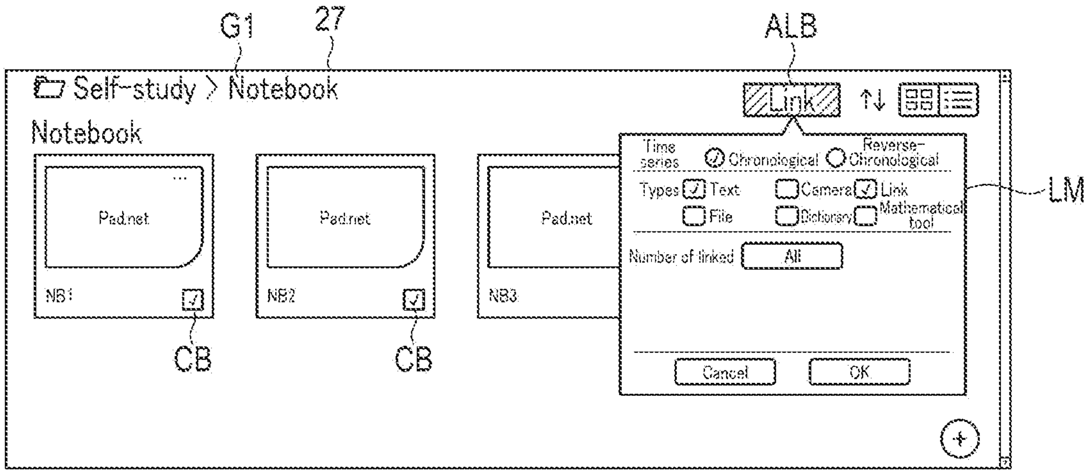
F I G. 15
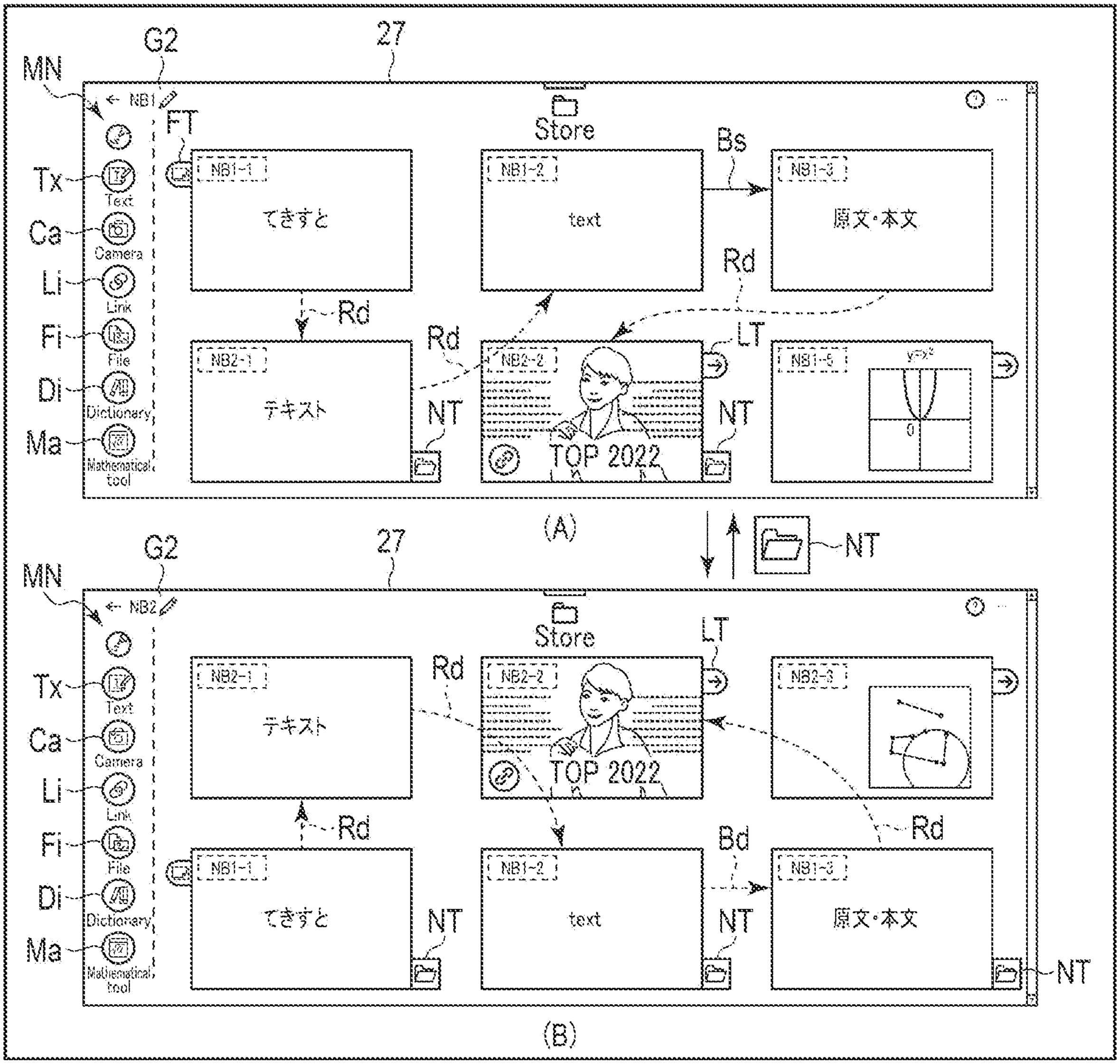
F I G. 16

INFORMATION GENERATION APPARATUS FOR GENERATING AND CORRELATING ELECTRONIC STICKY NOTES, AND INFORMATION GENERATION METHOD AND STORAGE MEDIUM FOR SAME

CROSS-REFERENCE TO RELATED APPLICATION(S)

This application is based upon and claims the benefit of priority from prior Japanese Patent Applications No. 2022-205522 and No. 2022-205525, filed Dec. 22, 2022, the entire contents of which are incorporated herein by references.

FIELD

The present disclosure relates to an information generation apparatus, an information generation method, and a storage medium.

BACKGROUND

It has been made practical in an information processing apparatus, such as a personal computer or a tablet device, to display an electronic sticky note, to which content (sticky note information) such as discretionarily selected comments is input, on a display area (screen) produced by inputting various information and using the electronic sticky note as if it is a paper sheet or sticky note.

Electronic sticky notes are a display object in a predetermined size and shape that can display text or other items that a user wants to take note of and is displayed at a user's discretionarily designated location within a predetermined display area, and such a display object can be created and deleted, and content displayed thereon can be added and edited.

Electronic sticky notes having a predetermined size and shape are easy to handle, like paper sticky notes. Not only the content of a sticky note but also a place to display a sticky note (paste position) make it easier for a user to remember a purpose of the sticky note.

An electronic sticky note display method for displaying a suitable electronic sticky note in which sticky note information relating to information displayed on the screen that a user requests to display is input has been proposed (for example, Jpn. Pat. Appln. KOKAI Publication No. 2022-137863, hereinafter "patent literature 1").

SUMMARY

An information generation apparatus according to the present disclosure causes a plurality of electronic sticky notes to be displayed at different positions in a display area, receives conditions for organizing including a first condition for classifying the plurality of electronic sticky notes in accordance with a user's operation, and performs processing of organizing and displaying the plurality of electronic sticky notes classified into a first group by the first condition in accordance with a user's operation to instruct organizing the electronic sticky notes in accordance with the condition for organizing in such a manner that the plurality of electronic sticky notes classified in the first group are identifiable in the display area from other electronic sticky notes that are not classified into the first group.

BRIEF DESCRIPTION OF THE DRAWING(S)

FIG. 3 is a diagram showing a sticky note management table (12*d*) stored in a sticky note management table data storage area 12*d* of the information generation server 10.

FIG. 4 is a block diagram showing a configuration of electronic circuitry of a user terminal 20.

FIG. 11 is a flowchart of the electronic sticky note grouping process between a plurality of notebooks in accordance with the server control program 12*a* of the information generation server 10.

Figure 12:
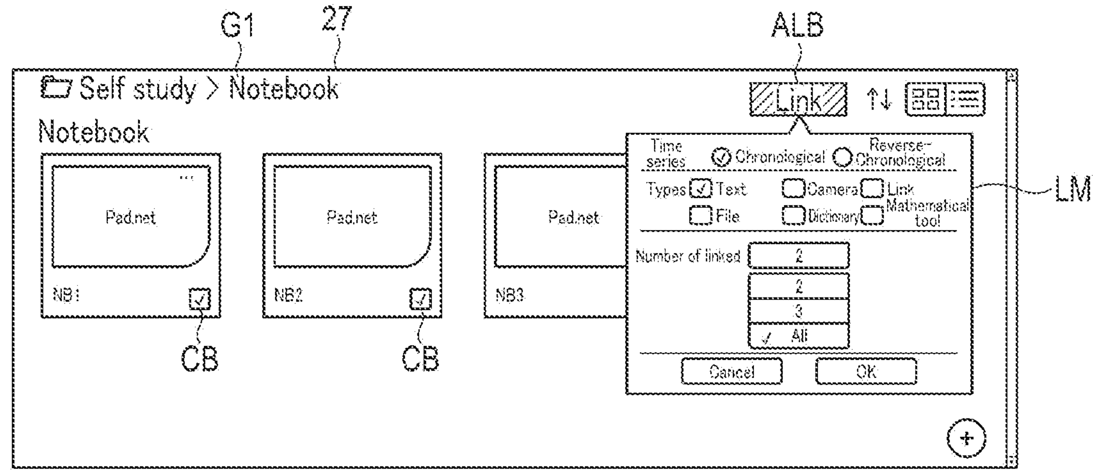
FIG. 12 is a diagram showing an operation of displaying electronic sticky notes in a case where an automatic [Link] button ALB on a notebook list window G1 is operated in accordance with the electronic sticky note grouping process between a plurality of notebooks of the information generation server 10.
Figure 13:
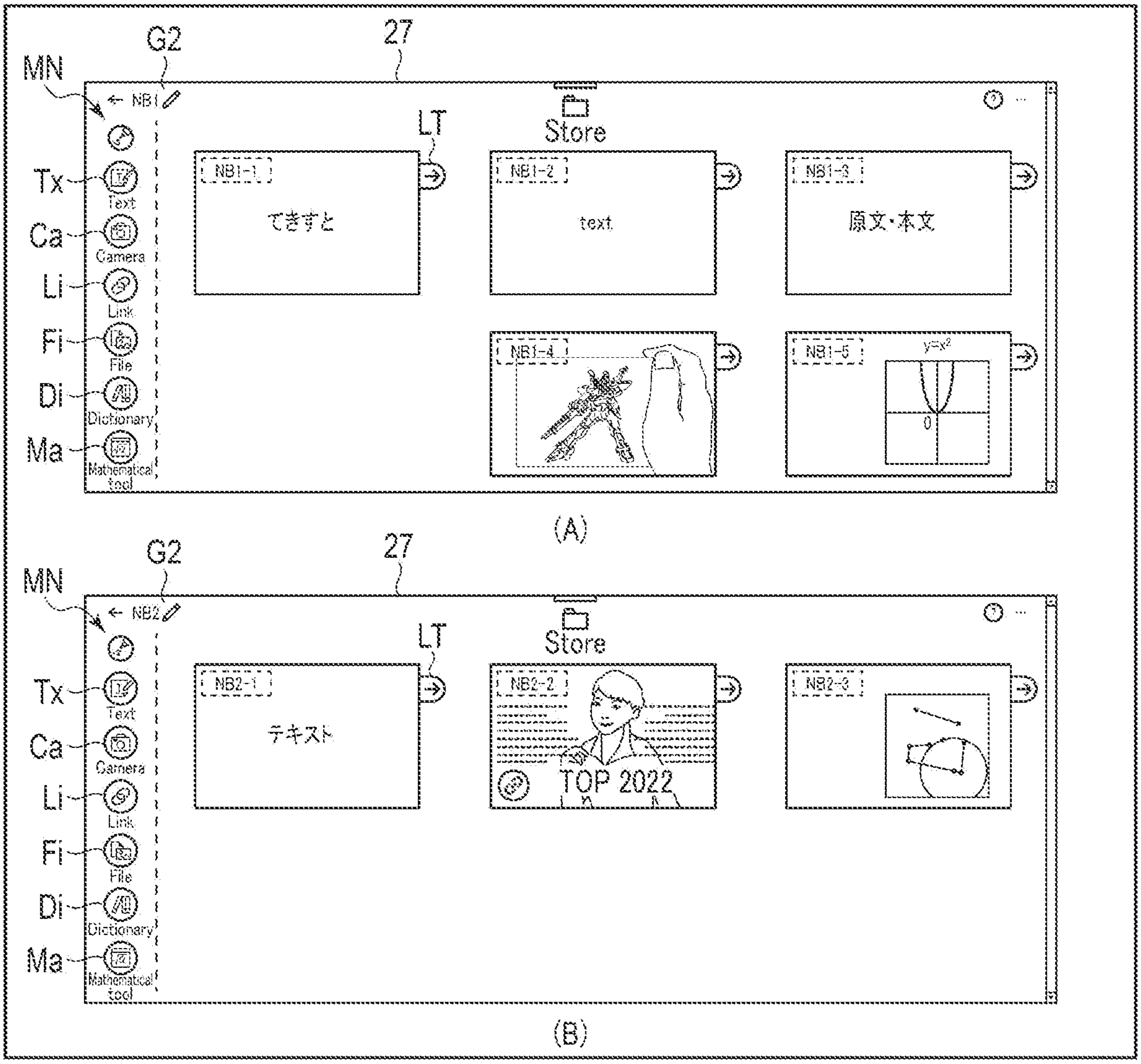
FIG. 13 shows an example of a display of the notebook window G2 of the notebook NB1 and the notebook window G2 of the notebook NB2 that are selected as a target of the electronic sticky note grouping process between a plurality of notebooks.

FIG. 14 shows an example of a display of the notebook window G2 of the notebook NB1 and the notebook list window G2 of the notebook NB2 in a case where the grouping process is performed in accordance with the conditions for linking (connecting) that are set in the linking setting menu LM shown in FIG. 12, which targets a total of eight electronic sticky notes NB1-1 through NB1-5 and NB2-1 through NB2-3 included in two notebooks NB1 and NB2 shown in FIG. 13.

FIG. 15 shows an example of a display indicating the notebook list window G1 in which the linking setting menu LM in a case where the grouping process is performed a second time with the change of the conditions for linking (connecting) after the electronic sticky notes grouping process between the plurality of notebooks as shown in FIG. 14 is performed.

FIG. 16 shows an example of a display indicating the notebook window G2 of the notebooks NB1 and NB2 in a case where the grouping process is performed a second time under the changed conditions for linking (connecting) that are set in the linking setting menu LM shown in FIG. 15 for the target of two notebooks NB1 and NB2 which have been subjected to the electronic sticky notes grouping process between the plurality of notebooks as shown in FIG. 14.

DETAILED DESCRIPTION

Hereinafter, embodiments of the present disclosure will be described with reference to the drawings.

Embodiment

Figure 1:
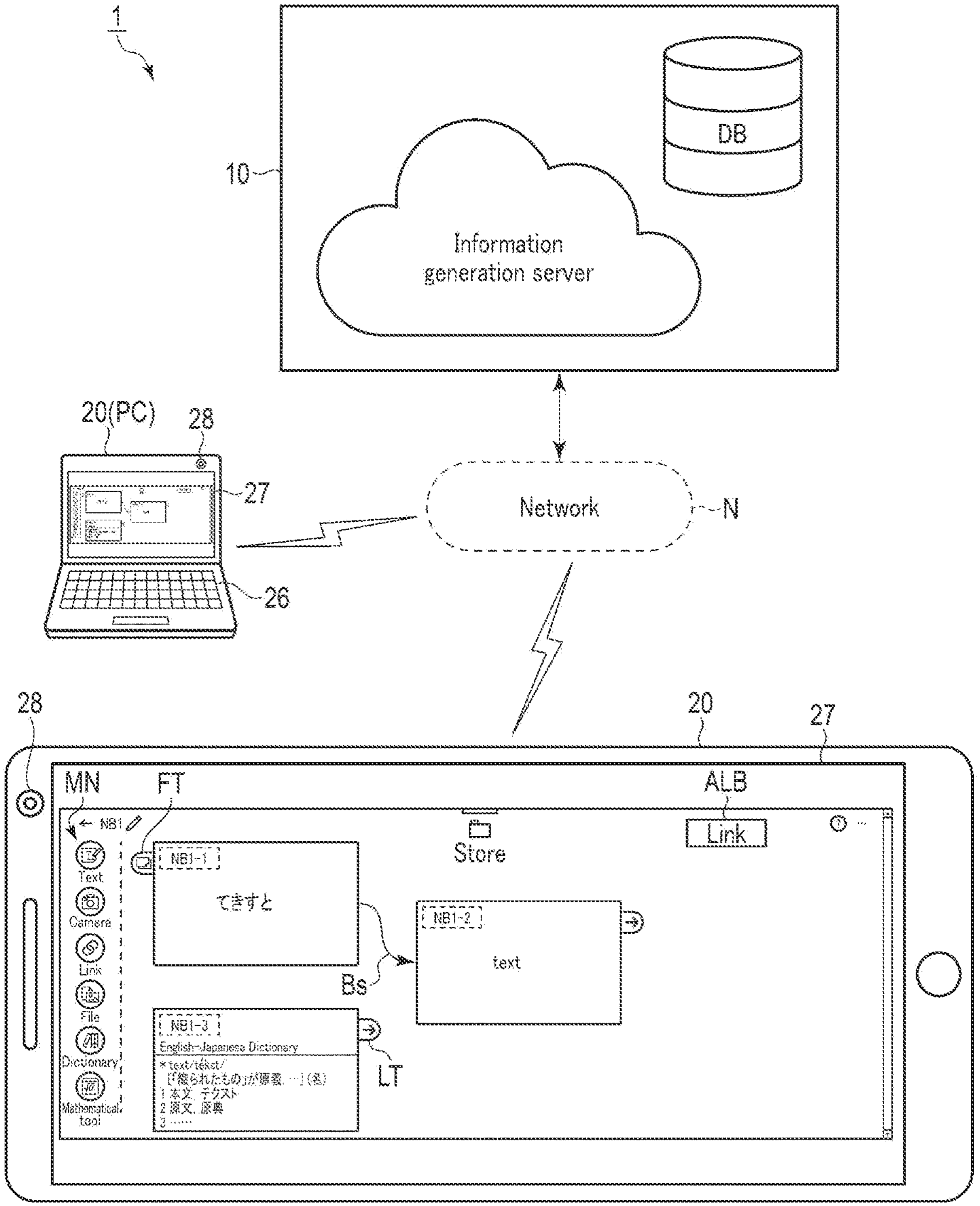
FIG. 1 is a drawing showing an overall configuration of an information generation system 1 according to an embodiment of an information generation apparatus, an information generation method, and a program of the present disclosure.

FIG. 1 is a drawing showing an overall configuration of an information generation system according to an embodiment of an information generation apparatus, an information generation method, and a storage medium of the present disclosure.

The information generation system 1 is constituted by an information generation server 10 (server apparatus) provided on a communication network N such as the Internet, and a user terminal 20 (communication device) that connects to and uses the information generation server 10.

Herein, the information generation server 10 is a dedicated server that connects an information generation server using application for using the information generation server 10 to a cloud service. The information generation server 10 and the user terminal 20 may serve as an information generation apparatus of the present disclosure.

The user terminal 20 (communication device) may be configured as a tablet device having a communication function, a smartphone, a PC, an electronic dictionary, a mobile phone, an electronic book, and a portable game player.

An information generation server using application program (information generation server using application) is installed on the user terminal 20.

<Functions of Information Generation Server 10>

The information generation server 10 has at least the following functions (10*a*) to (10*i*) if it is connected to the user terminal 20 in accordance with an information generation server using application of the user terminal 20.

(10*a*) Function of generating, in response to an operation of the user terminal 20, a notebook window G2 of a display area (notebook NB1) with which a user can input discretionarily selected information and display it, and causing the notebook window G2 to be displayed on the display unit 27 of the user terminal 20.

(10*b*) Function of generating electronic sticky notes (NB1-1 through NB1-3) to which a type of information selected from the notebook menu MN is input in response to a user's operation of the notebook menu MN provided on the notebook window G2, and causing the electronic sticky notes to be displayed at a user's discretionarily selected positions in the notebook NB1.

(10*c*) Function of moving the [Link] tab LT added on the right side of the electronic sticky note (NB1-*n*) to another electronic sticky note in the notebook NB1 (moving from NB1-1 to NB1-2 in FIG. 1) in response to a user's operation, and connecting (linking) the electronic sticky notes NB1-1 and NB1-2 with a blue solid-line linking arrow Bs in a sequence to organize.

(10*d*) Function of displaying a connection setting menu LM (see FIG. 9) in accordance with a user's operation of an automatic [Link] button ALB for the target of a plurality of multiple electronic sticky notes (NB1-1 through NB1-3) displayed in the notebook NB1, organizing a plurality of multiple electronic sticky notes (NB1-1 and NB1-2 in FIG. 1) classified (grouped) in accordance with the linking conditions (organizing conditions) including types of information of the electronic sticky notes designated according to the linking setting menu LM by automatically connecting (automatically linking) the sticky notes in a sequence in the order with a blue solid-line inking arrow Bs, and displaying the classified electronic sticky notes by making them identifiable from not classified (grouped) electronic sticky notes NBm-n.

Figure 10:
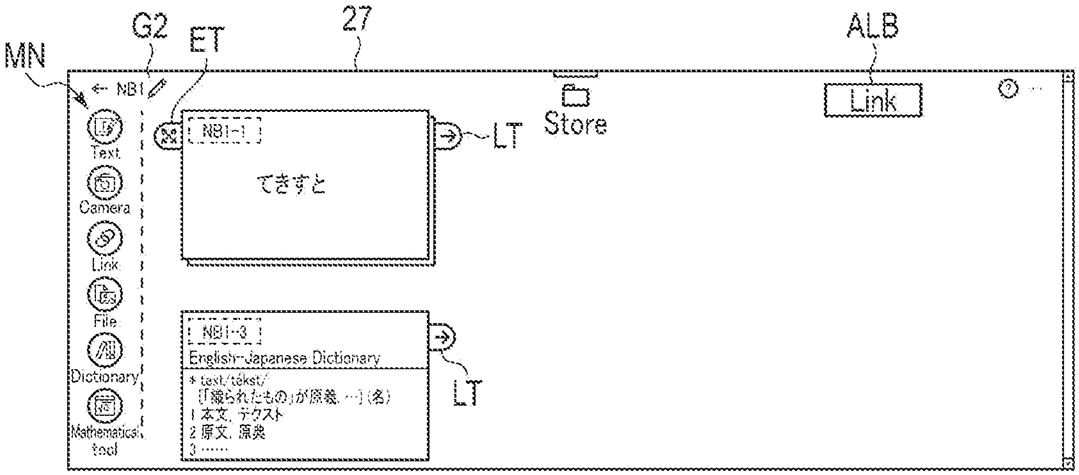
FIG. 10 is a diagram showing an operation of displaying a plurality of folded electronic sticky notes NB1-*n* linked (connected) in accordance with an electronic sticky note (expanding/folding) process of the information generation server 10.

(10*e*) Function of displaying the electronic sticky notes (NB1-1 and NB1-2) connected (linked) and organized in a sequence, which were originally displayed in an expanded state, in a folded state by folding the second sticky note (NB1-2) and subsequent sticky notes under the top sticky note (NB1-1) so as to fit in a predetermined range, in accordance with a user's operation of the [Fold] tab FT added to the left side of the top electronic sticky note (NB1-1) (see FIG. 10).

(10*f*) Function of displaying the plurality of electronic sticky notes (NB1-1 and NB1-2), which are currently displayed in a folded state, in an original expanded state in accordance with a user's operation of the [Expand] tab ET added to the left edge of the top electronic sticky note (NB1-1).

(10*g*) Function of performing predetermined processing of subsequently switching the electronic sticky notes (NB1-*n*) linked in a sequence from the top (NB1-1) to the last (NB1-*n*), with the sticky notes being displayed in an expanded state, like a slide show, in accordance with a display mode selected in accordance with a user's operation.

(10*h*) Function of displaying, with the notebook list window G1 (see FIG. 12) listing the icons of a plurality of notebooks (NB1 through NB3) being displayed, a link setting menu LM (see FIG. 12) in accordance with a user's operation of an automatic [Link] button ALB for a plurality of electronic sticky notes (see FIG. 13; NB1-1 through NB1-5 and NB2-1 through NB2-3) included in a plurality of notebooks (NB1 and NB2 in FIG. 12) as targets, which are designated in accordance with a user's operation of a checkbox CB of the notebook icons (NB1 through NB3). Herein, a group of electronic sticky notes NBm-n is formed in each of the plurality of notebooks NBm.

(10*i*) Function of automatically linking and organizing a plurality of electronic sticky notes (NB1-1, NB2-1, NB1-2, NB1-3 in FIG. 13) classified in accordance with linking conditions (organizing conditions) including information types of the electronic sticky notes designated by the linking setting menu LM of the notebook list window G1, by automatically connecting the electronic sticky notes (NB1-1 through NB2-1 and NB2-1 through NB1-2) crossing over different notebooks (NB1 and NB2) in a sequence with a red dotted-line linking arrow Rd (see FIG. 14), by automatically connecting the electronic sticky notes (NB1-2 through NB1-3) in the notebook (NB1), which is displayed with priority, in a sequence, with a blue solid-line linking arrow Bs (see FIG. 14(A)), and by automatically connecting the electronic sticky notes (NB1-2 through NB1-3) in a notebook (NB1) differing from the notebook (NB2), which is displayed with priority, in a sequence with a blue dotted-line linking arrow Bd (see FIG. 14(B)).

In the embodiment, connecting electronic sticky notes refers to connecting multiple sticky notes (NB1-*n*) in an order in a sequence.

In the embodiment, "organizing" multiple sticky notes includes sorting and grouping a plurality of electronic sticky notes so as to make them identifiable and making the order of the notes identifiable.

In the embodiment, the symbol NBm (e.g., NB1, NB2) indicates a notebook ID (identification information) but may be read as a notebook name that is input by a user. The symbol NBm-n (e.g., NB1-1, NB1-2) indicates an electronic sticky note ID generated in the notebook NBm but may be read as an electronic sticky note name that is input by a user. Specifically, a notebook name may be a unit name of a subject or a date and time of studying, such as a name of a subject that a user is studying.

<Electronic Circuitry of Information Generation Server 10>

Figure 2:
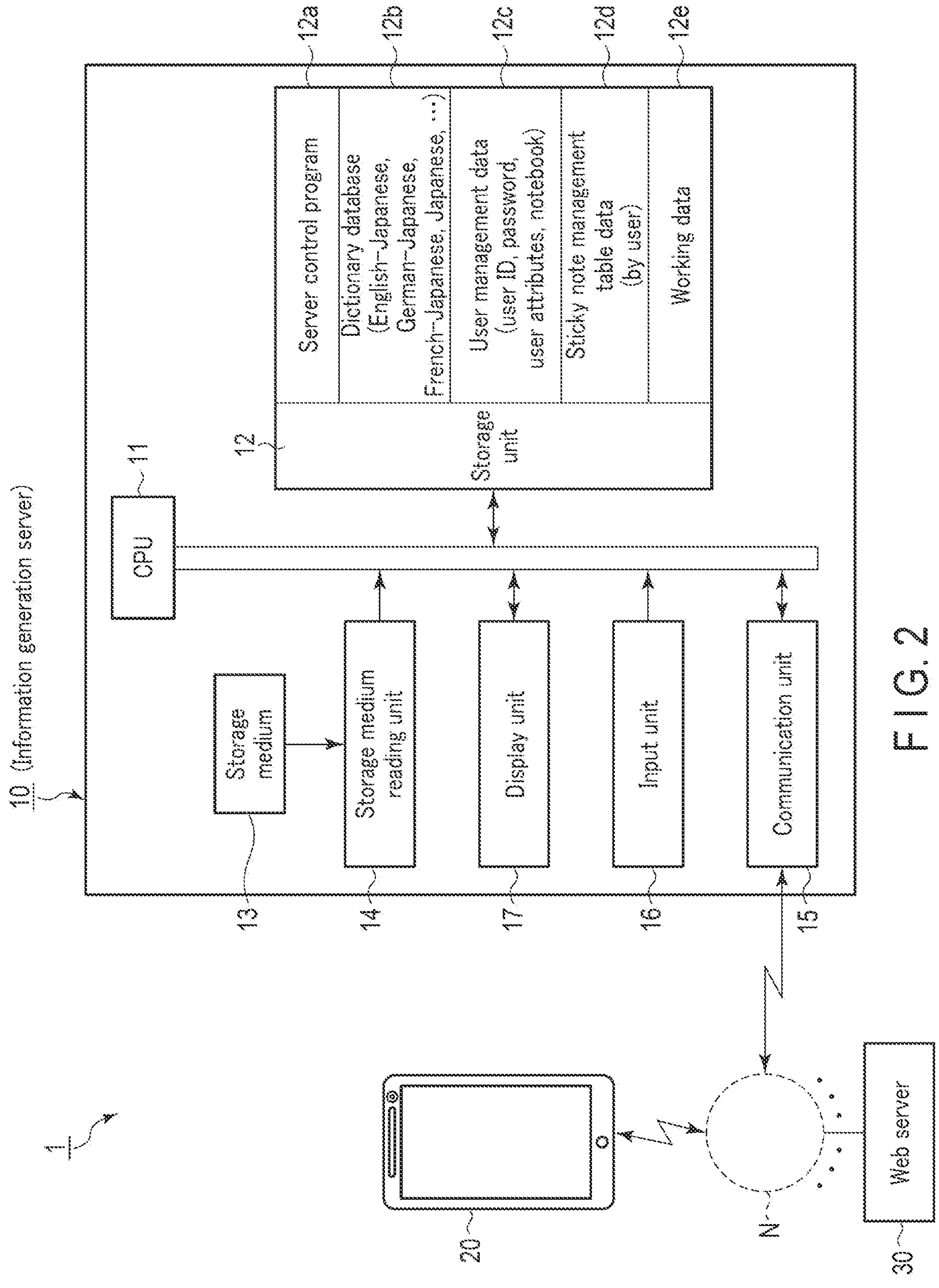
FIG. 2 is a block diagram showing a configuration of electronic circuitry of an information generation server 10.

FIG. 2 is a block diagram showing a configuration of electronic circuitry of the information generation server 10.

The electronic circuitry of the information generation server 10 includes a control unit (central processing unit, CPU) 11, which is a computer, a storage unit 12, a storage medium reading unit 14, a communication unit 15, an input unit 16, and a display unit 17.

The control unit 11 controls, in accordance with the server control program 12*a* stored in the storage unit 12, an operation of each unit in the circuitry in accordance with an input signal from the input unit 16 in response to a user's operation or a signal from a user terminal 20 on a communication network N by the communication unit 15.

The server control program 12*a* may be stored in the storage unit 12 in advance, read from an external storage medium 13, such as a CD-ROM, through the storage medium reading unit 14 and stored in the storage unit 12, or downloaded from a Web server (in this case, the program server 30) on a communication network N and stored in the storage unit 12.

The server control program 12*a* includes a program for executing at least the foregoing functions (10*a*) through (10*i*).

The storage unit 12 secures a dictionary database storage area 12*b*, a user management data storage area 12*c*, a sticky note management table data storage area 12*d*, and a working data storage area 12*e*, in addition to the storage area of the server control program 12*a*.

In the dictionary database storage area 12*b*, data of various dictionaries, such as an English-Japanese dictionary, a German-Japanese dictionary, a French-Japanese dictionary, and a Japanese dictionary, are stored as dictionary data in which an entry word is associated explanatory information (a translation of the entry word, definition, example sentences, explanation).

In the user management data storage area 12*c*, data of a user's registered password, a user's attributes (work (school), a grade year, etc.), and content of a notebook (NBm) including electronic sticky notes (NBm-n) generated in response to a user's operation are stored, along with a user ID (user identification information; herein, application ID), are stored for each user of a user terminal 20 on which an information generation server using application is installed, in association with a notebook ID and an electronic sticky note ID.

FIG. 3 is a diagram showing a sticky note management table (notebook management table) (12*d*) stored in the sticky note management table data storage area 12*d* of the information generation server 10.

In the sticky note management table (notebook management table) 12*d*, for each user ID stored (registered) in the user management data storage area 12*c*, in association with a notebook ID of a notebook (NBm) generated in accordance with a user's operation, an electronic sticky note ID of an electronic sticky note (NBm-n) included in the notebook (NBm), a type of information selected from the notebook menu MN, data attributes included in the electronic sticky note (NBm-n) (date and time of creation/edit, data setting information such as a data format, sub-attributes, etc.), a coordinate of a display position in the notebook (NBm) of the electronic sticky note (NBm-n), a size of the electronic sticky note (NBm-n), a connection opening/closing flag indicative of whether an electronic sticky note linked (connected) to other electronic sticky notes is expanded or folded to display, and connected sticky note IDs indicative of electronic sticky note IDs of a connection source and a connection destination are stored.

The connecting of electronic sticky notes in the embodiment is mainly to connect multiple electronic sticky notes (NB1-*n*) in a sequence; therefore, electronic sticky note IDs of the connection destination and the connection source stored in the connected sticky note IDs are limited to one at maximum, respectively. It is thereby possible to restrict creating a new connection to an electronic sticky note in a case where another electronic sticky note ID is already stored in the destination/source of the linked sticky note ID, so as to prevent the connected state of the electronic sticky note from being divided into multiple sequences.

The electronic sticky note table (notebook management table) (12*d*) collectively stores management information of the electronic sticky notes (NBm-n) included in each group (notebook Nbm) for a plurality of electronic sticky notes (NB1-*n*/NB2-*n*/NBm-n) included in each of the notebooks (NB1, NB2, . . . ), namely groups, and is a management table for notebooks NBm with which stored management information can be updated in accordance with generation of a group (notebook NBm) and electronic sticky notes (NBm-n) included in the group (notebook NBm) and for updating of information.

The working data storage area 12*e* may temporarily store various data generated or acquired by a control of an operation in each unit by the control unit 11, as needed.

The information generation server 10 configured in the above-described manner realizes various functions, which will be described later in connection with the explanation of the operations, through the control of an operation of each circuitry unit by the control unit 11 in accordance with an instruction described in the server control program 12*a* and an operation of software and hardware in conjunction.

<Electronic Circuitry of User Terminal 20>

FIG. 4 is a block diagram showing a configuration of electronic circuitry of the user terminal 20.

The electronic circuitry of the user terminal 20 includes a control unit (CPU) 21, which is a computer, a storage unit 22, a storage medium reading unit 24, a communication unit (Wi-Fi (registered trademark) communication/mobile communication) 25, a key input unit 26, a touch-screen display unit 27, and an imaging unit 28.

The control unit 21 controls an operation of each circuitry unit in accordance with the user terminal control program 22*a* and the information generation server using application program (information generation server using application) 22*b* stored in the storage unit 22. The user terminal control program 22*a* may be stored in the storage unit 22 in advance, or may be read from the external storage medium 23 such as a memory card by the storage medium reading unit 24 and stored in the storage unit 22, or may be downloaded from the Web server (program server in this example) 30 on a communication network N via the communication unit 25 and stored in the storage unit 22.

The information generation server using application 22*b* is downloaded from the Web server (a program server in an application store in this example) 30 on a communication network N via the communication unit 2 and stored in the storage unit 22.

The user terminal control program 22*a* includes, other than a system program for controlling the entire user terminal 20, a program for connecting to and communicating with an external device including the information generation server 10 and the Web server 30 on the communication network N in conjunction with various application programs stored in the storage unit 22.

The information generation server using application 22*b* includes a program for executing data input/output processing in accordance with the foregoing functions (10*a*) to (10*i*) through a communication connection with the information generation server 10.

A key input unit 26, a touch-screen display unit 27, and an imaging unit (camera) 28 are connected to the control unit 21 via the system and data bus, as well as the storage unit 22, the storage medium reading unit 24, and the communication unit 25.

In the storage unit 22, a terminal device data storage area 22*c* and a working data storage area 22*d* are secured, in addition to a program storage area for storing a user terminal control program 22*a* and an information generation server using application 22*b*.

In the terminal device data storage area 22*c*, aside from terminal device numbers for communicating with and connecting to an external communication devices including the information generation server 10 and Web server 30 on the communication network N, data of telephone numbers, mail addresses, user IDs (user identification information; an application ID in this example), user's attributes (work (school)/a year in school) are stored as terminal data unique to the user terminal 20.

The working data storage area 22*d* may temporarily store various data generated or acquired by a control of an operation in each unit by the control unit 21, as needed.

The user terminal 20 configured in the above-described manner realizes various functions, which will be described later in connection with the explanation of the operations, through the control of an operation of each circuitry unit by the control unit 21 in accordance with an instruction described in the user terminal control program 22*a* and the information generation server using application 22*b* and an operation of software and hardware in conjunction.

Operation According to Embodiment

Next, an operation of the information generation system 1 of the embodiment is described.

Figure 5:
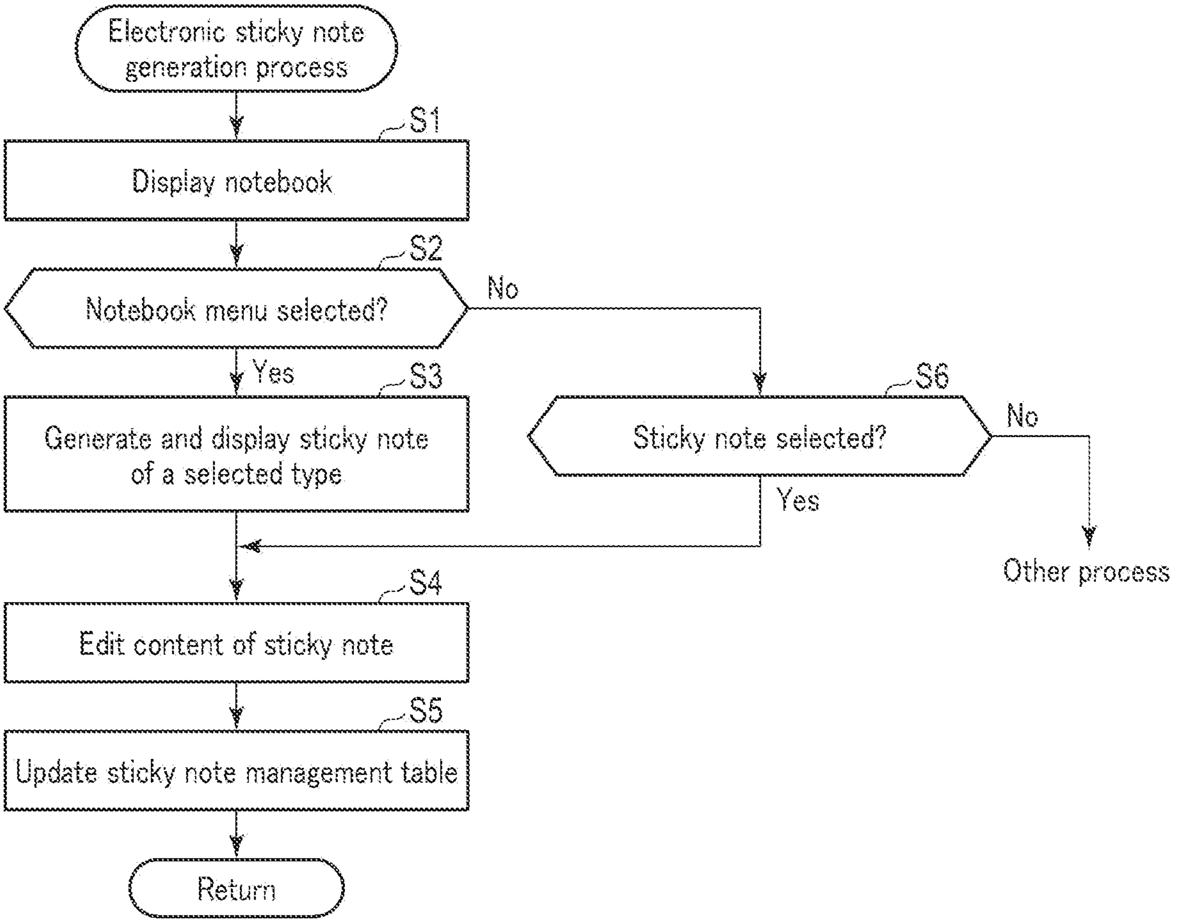
FIG. 5 is a flowchart showing an electronic sticky note generation process according to a server control program 12*a* of the information generation server 10.

FIG. 5 is a flowchart showing an electronic sticky note generation process according to the server control program 12*a* of the information generation server 10.

Figure 6:
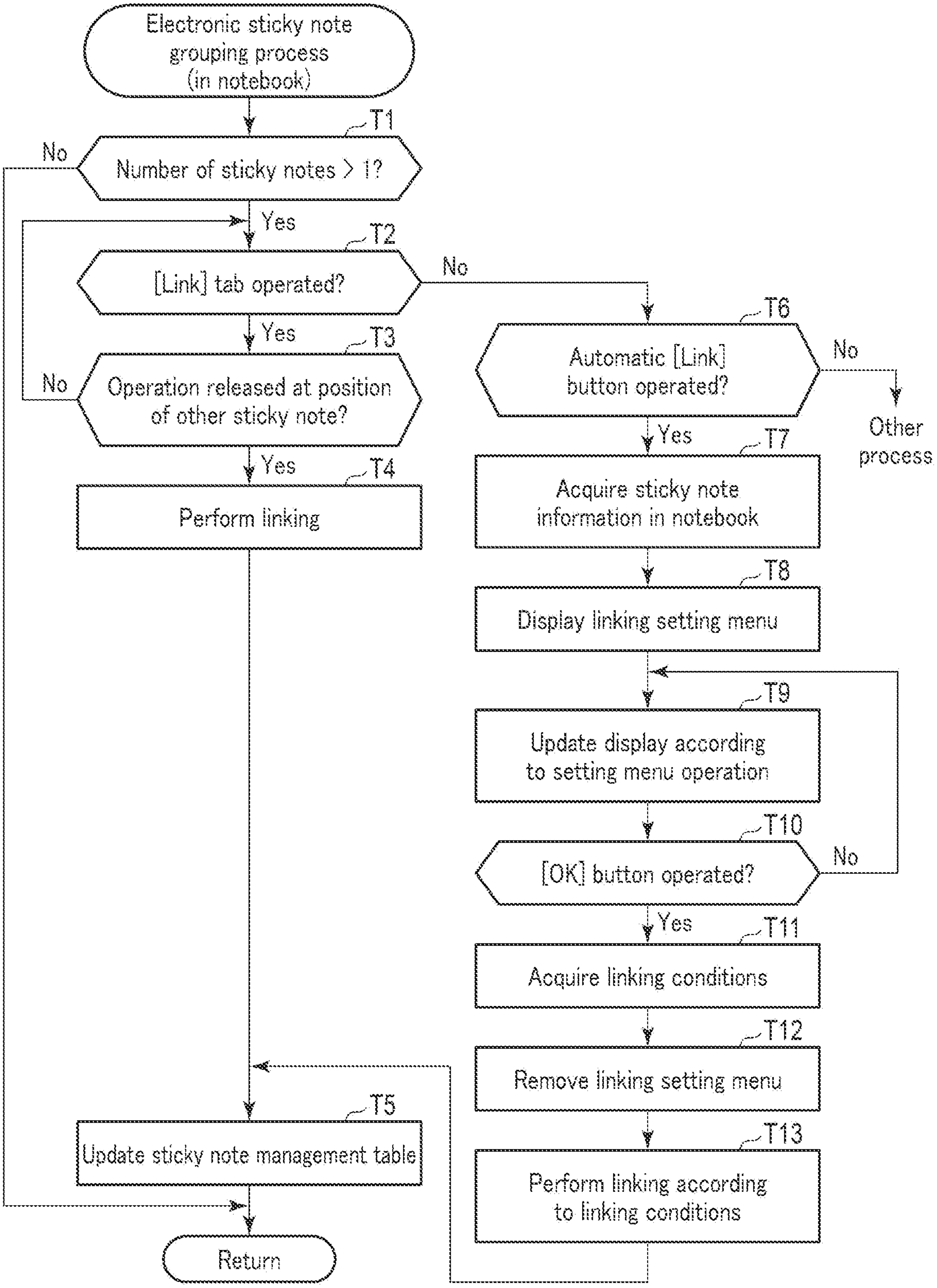
FIG. 6 is a flowchart showing an electronic sticky note grouping process in a notebook according to the server control program 12*a* of the information generation server 10.

FIG. 6 is a flowchart showing an electronic sticky note grouping process in a notebook according to the server control program 12*a* of the information generation server 10.

Figure 7:
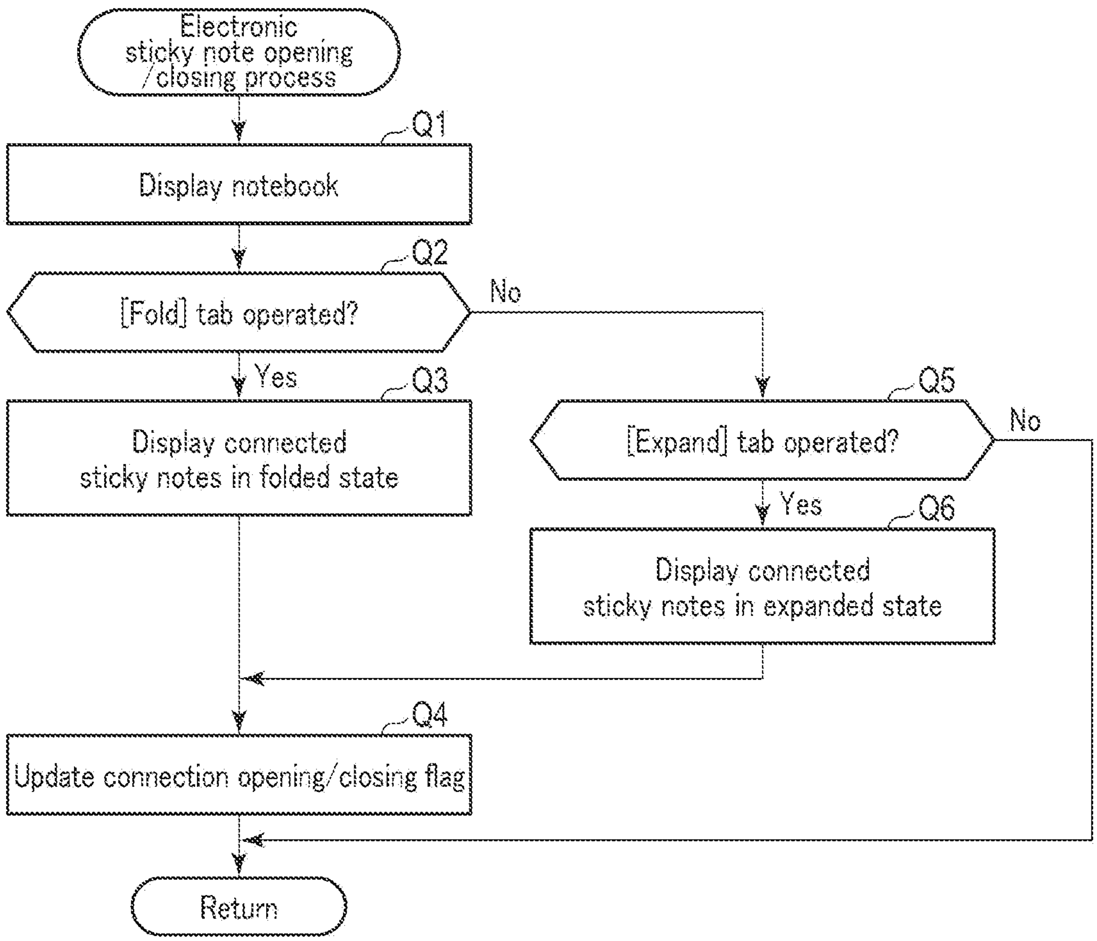
FIG. 7 is a flowchart showing an electronic sticky note opening/closing (expanding/folding) process according to the server control program 12*a* of the information generation server 10.

FIG. 7 is a flowchart showing an electronic sticky note opening/closing (expanding/folding) process according to the server control program 12*a* of the information generation server 10.

Figure 8:
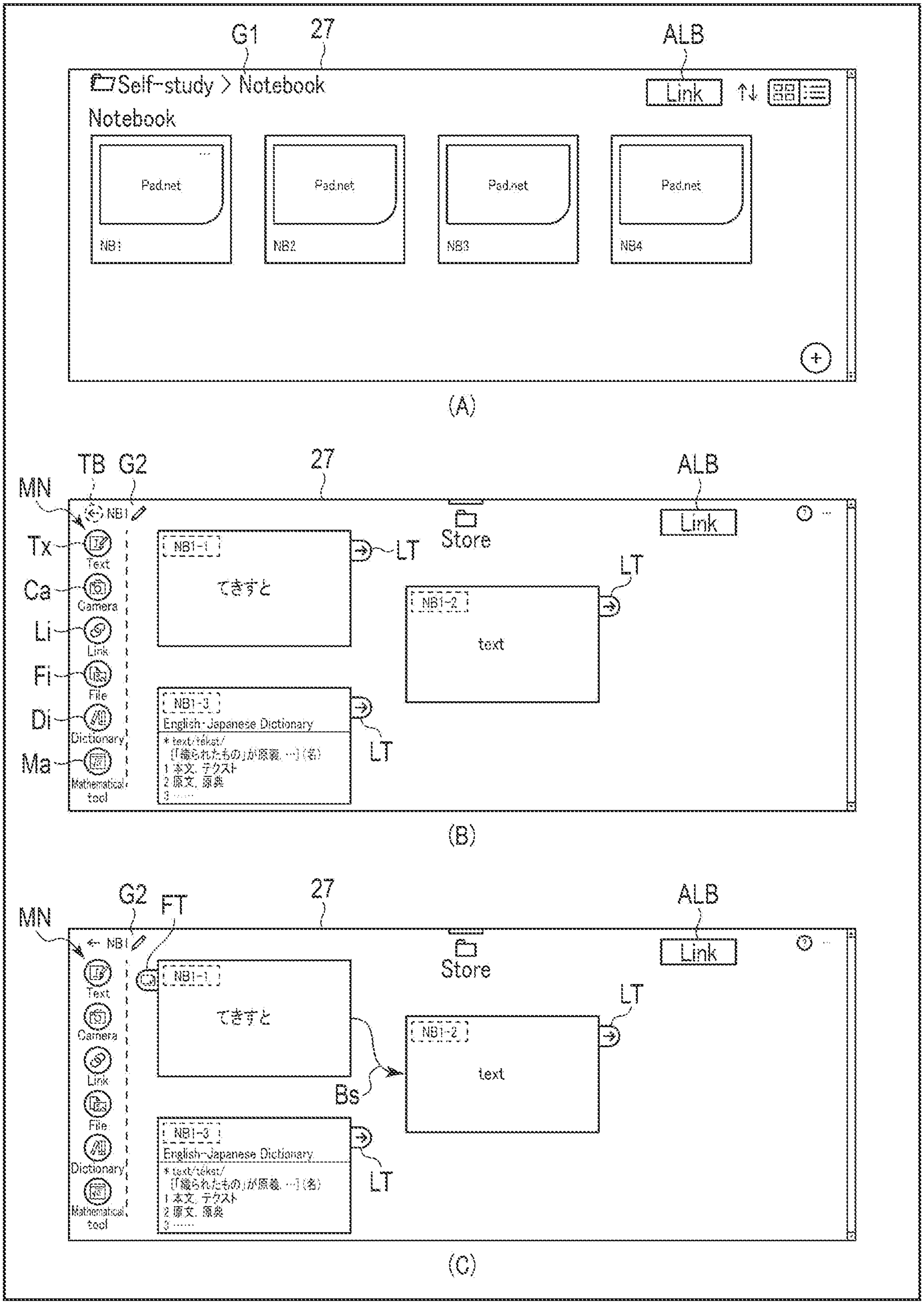
FIG. 8 is a diagram showing a screen change on the user terminal 20 side according to the electronic sticky note generation process and the electronic sticky note grouping process in the information generation server 10.

FIG. 8 is a diagram showing a screen change on the user terminal 20 side according to the electronic sticky note generation process and the electronic sticky note grouping process of the information generation server 10.

In the information generation server 10, the control unit 11, while it is communicating with and being connected to the user terminal 20 in accordance with a login request from the user terminal 20, causes the touch-screen display unit 27 of the user terminal 20 to display the notebook NBm (herein NB1 through NB3) generated in accordance with a user's operation as shown in FIG. 8(A), as a notebook list window G1 listing notebook icons (NB1 through NB3).

<Electronic Sticky Note Generation Process (FIG. 5)>

In response to designation of the notebook icon (NB1) by a touch operation in the notebook list window G1, the control unit 11 reads data of the designated notebook NB1 from the user management data storage area 12*c* and causes the touch-screen display unit 27 to display the data as a notebook window G2 of the notebook NB1 as shown in FIG. 8(B) based on the sticky note management table (12*d*) (step S1). The touch operation on the display screen may be a click operation by a mouse cursor or a combination of a designation operation and determination operation using a pointer device, and this applies to the descriptions hereinafter.

Herein, suppose the electronic sticky note NB1-*n* has not yet been generated in the notebook NB1.

If a user wishes to generate an electronic sticky note NB1 into which discretionarily selected information is input and attach the same on the notebook NB1, in response to selecting of a button (Tx/Ca/Li/Fi/Di/Ma) indicative of information of a discretionarily selected type from the notebook menu MN arranged on the left edge of the notebook window G2 (Yes in step S2), the control unit 11 generates an electronic sticky note NB1-*n* that can be generated by inputting the information of the selected type thereto and causes the electronic sticky note NB1-*n* to be displayed in the notebook NB1 (step S3).

The notebook menu MN includes, for example, a [Text] button Tx, a [Camera] button Ca, a [Link] button Li, a [File] button Fi, a [Dictionary] button Di, and a [Mathematical tool] button Ma.

In response to selecting of the [Text] button Tx, the control unit 11 causes a new electronic sticky note NB1-*n* to be displayed in the notebook NB1 and starts a text input application of the user terminal 20, and then inputs and displays a discretionarily selected text in accordance with a user's operation to the electronic sticky note NB1-*n* and allows the text to be editable (step S4).

In response selecting of the [Camera] button Ca, the control unit 11 causes a new electronic sticky note NB1-*n* to be displayed in the notebook NB1 and starts the imaging unit (camera) 28 of the user terminal 20, and then inputs a photograph image taken by the imaging unit (camera) 28 to the electronic sticky note NB1-*n* to allow the photograph image to be displayable and editable (step S4).

In response selecting of the [Link] button Li, the control unit 11 causes a new electronic sticky note NB1-*n* to be displayed in the notebook NB1 and starts a Web browser of the user terminal 20, and then inputs a user's discretionarily selected Web page to the electronic sticky note NB1-*n* so as to allow the Web page to be displayable and editable (step S4)

In response selecting of the [File] button Fi, the control unit 11 causes a new electronic sticky note NB1-*n* to be displayed in the notebook NB1 and starts a file operation application of the user terminal 20, and then inputs a discretionarily selected file to the electronic sticky note NB1-*n* so as to allow the file to be displayable and editable (step S4).

In response selecting of the [Dictionary] button Di, the control unit 11 causes a new electronic sticky note NB1-*n* to be displayed in the notebook NB1 and starts a dictionary application of the server 10, and then searches for a discretionarily selected entry word and explanation information thereof for the electronic sticky note NB1-*n* in the dictionary database (12*b*) so as to allow them to be displayable and editable (step S4).

In response selecting of the [Mathematical tool] button Ma, the control unit 11 causes a new electronic sticky note NB1-*n* to be displayed in the notebook NB1 and starts a mathematical tool application of the information generation server 10, and then inputs mathematical data of a mathematical expression, a graph, and a statistic table, using a discretionarily selected mathematical tool to the electronic sticky note NB1-*n* and allows the mathematical data to be displayable and editable (step S4).

The notebook menu MN is not limited to the foregoing [Text] button Tx, [Camera] button Ca, [Link] button Li, [File] button Fi, [Dictionary] button Di, [Mathematical tool] button Ma, and another button for inputting other types of information may be provided.

The electronic sticky note NB1-*n* displayed in the notebook NB1 is moved to another display position by a user's touch operation and dragging (moving).

The color of the electronic sticky note NB1-*n* generated in the notebook NB1 is changed to a discretionarily selected color in accordance with a user's operation.

After the electronic sticky note NB1-*n* to which a user's discretionarily selected information is input and displayed at a discretionarily selected position is generated, and a [←] ("close") button TB on the notebook window G2 is touch-operated, the control unit 11 has a type, attributes, a coordinate, a size, a connection opening/closing flag, and a connected sticky notes ID of the sticky note management table (12*d*) stored in association with the electronic sticky note ID of the generated electronic sticky note NB1-*n* (step S5).

Herein, the notebook window G2 of the notebook NB1 as shown in FIG. 8(B) for example shows a state of displaying two electronic sticky notes NB1-1 and NB1-2, which are generated by inputting text thereto based on an operation of the [Text] button Tx, and electronic sticky note NB1-3 generated by searching for a dictionary entry word and explanation information thereof based on an operation of the [Dictionary] button Di.

As shown in FIG. 8(B) for example, with the notebook window G2 of the notebook NB1 including the generated electronic sticky notes (herein NB1-1 through NB1-3) being displayed (step S1), if an electronic sticky note NB1-*n* is discretionarily selected (Yes in step S6), the control unit 11 additionally makes the content of the selected electronic sticky note NB1-*n* editable based on the notebook menu MN, as described earlier (step S4).

<Electronic Sticky Note Grouping Process (in Notebook; FIG. 6)>

For example, with the notebook window G2 of the notebook NB1 shown in FIG. 8(B) being displayed in the touch-screen display unit 27 of the user terminal 20, if the number of electronic sticky notes NB1-*n* included in the notebook NB1 is greater than 1 (the number of sticky notes >1) (Yes in step T1), the control unit 11 allows a touch operation to the [Link] tab LT added to the electronic sticky note NB1-*n* or a touch operation to an automatic [Link] button ALB standby (step T2/T6). The control unit 11 allows a touch operation to the [Link] tab LT added to the electronic sticky note NB1-*n* or a touch operation to the automatic [Link] button ALB standby (step T2/T6).

For example, if a user wishes to group the electronic sticky notes NB1-1 and NB1-2 by linking (connecting) according to a user's manual operation, the [Link] tab LT of the electronic sticky note NB1-1 is touch-operated and moved (dragged) (Yes in step T2), and if the moving of the touch operation is released at the display position of the other electronic sticky note NB1-2 (Yes in step T3), the control unit 11 connects (links) the electronic sticky notes NB1-1 and NB1-2 with a blue solid-line linking arrow Bs from the connection source to the connection destination (step T4), as shown in FIG. 8(C).

The control unit 11 updates the connection opening/closing flag and the connected sticky note IDs of the sticky note management table (12*d*) (see FIG. 3) based on the connected (linked) electronic sticky notes NB1-1 and NB1-2 (step T5).

The linking arrow that connects (links) the plurality of electronic sticky notes NB1-*n* may be deleted and the connection (link) may be canceled in accordance with a user's operation.

It is thereby possible for a user to group and organize a plurality of electronic sticky notes NB1-*n* generated in the notebook NB1 by manually connecting (linking) based on a user's discretionarily selected relationship.

Figure 9:
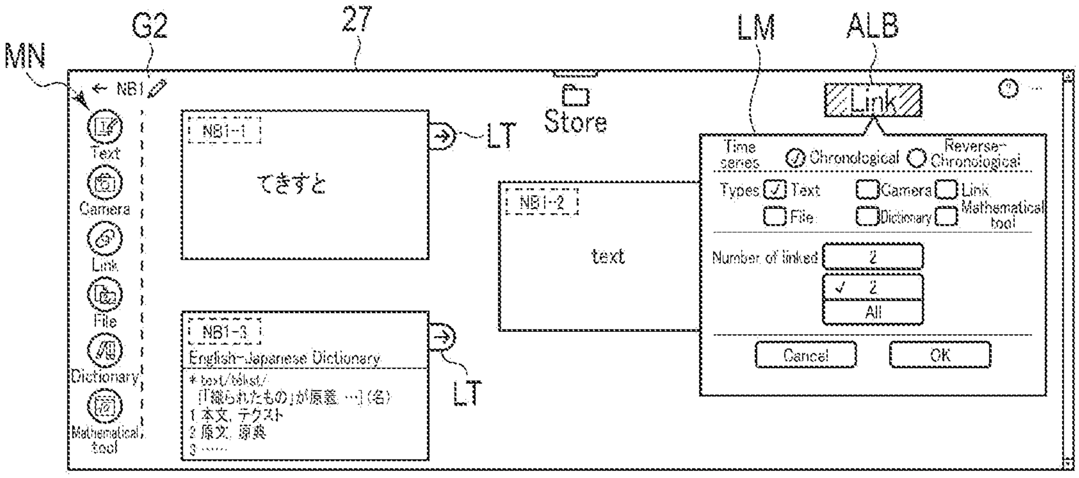
FIG. 9 is a diagram showing a display status of a linking setting menu LM in a case where an automatic [Link] button ALB on the notebook window G2 is operated in accordance with the electronic sticky note grouping process of the information generation server 10.

FIG. 9 is a diagram showing a display status of the linking setting menu LM in a case where the automatic [Link] button ALB on the notebook window G2 is operated, in accordance with the electronic sticky note grouping process of the information generation server 10.

For example, if a user wish to target the electronic sticky notes NB1-1 through NB1-3 included in the notebook NB1 displayed in the user terminal 20 shown in FIG. 8(B) for automatic linking (connecting) and grouping based on sticky note information including a type and attributes of each electronic sticky note NB1-*n* stored in the sticky note management table (12*d*), upon a touch operation of the automatic [Link] button ALB arranged on the notebook window G2 (Yes in step T6), the control unit 11 acquires information of types of the electronic sticky notes NB1-1 through NB1-3 included in the notebook NB1 from the sticky note management table (12*d*) (step T7).

The control unit 11 causes the linking setting menu LM to be displayed in association with the automatic [Link] button ALB as shown in FIG. 9 based on the information of types of the electronic sticky notes NB1-1 through NB1-3 acquired in step T7 (step T8).

In the linking setting menu LM, the following may be provided, for example: a select item [Time-series] for setting conditions for linking (connecting) in a chronological order from the oldest or the newest based on the date and time of creation/edit included as the attributes of each electronic sticky note NB1-*n*; a select item [Types] for setting conditions for linking (connecting) by designating a type ("text", "camera", "link", "file", "dictionary", "mathematical tool") of information of each electronic sticky note NB1-*n*; a select item [Number of linked] for the numbers of electronic sticky notes NB1-*n* to be linked (connected) in a chronological order or a reverse chronological order in accordance with the conditions designated by the select items [Time-series] and [Types].

Herein, if the types of the electronic sticky notes NB1-1 through NB1-3 acquired in step T7 are "text", "text", and "dictionary", respectively, the display of the information types included in the select item [Types] in the linking setting menu LM other than "text" and "dictionary" are grayed out (disabled) or the display of types may be not shown (step T8).

The control unit 11 causes a checkmark indicating a designated condition to be displayed in accordance with a user's operation to each select item ([Time-series], [Types], [Number of linked]) of the linking setting menu LM (step T9).

Thereafter, after the [OK] button of the linking setting menu LM is operated and the organizing of electronic sticky notes is instructed (Yes in step T10), the control unit 11 acquires the conditions for linking (connecting) in accordance with a display state of the checkmark in each select item in the linking setting menu LM (step T11), and the linking setting menu LM is removed from the notebook window G2 (step T12).

Herein, as the conditions for linking (connecting), suppose "chronological" for [Time-series], "text" for [Types], and "2" for [Number of linked] are acquired.

Targeting the electronic sticky notes NB1-1 through NB1-3 in the notebook NB1, the control unit 11 displays the electronic sticky notes NB1-1 and NB1-2 classified in accordance with the conditions for linking (connecting) acquired in step T11 by connecting (linking) them with a blue solid-line linking arrow Bs from the connection source to the connection destination as shown in FIG. 8(C) based on the type of information and attributes (herein, date and time of creation/edit) stored in the electronic sticky note management table (12*d*) (step T13).

The control unit 11 updates the connection opening/closing flag and the connected sticky note IDs of the sticky note management table (12*d*) (see FIG. 3) based on the connected (linked) electronic sticky notes NB1-1 and NB1-2 (step T5).

It is thus possible to automatically connect (link) and group the plurality of electronic sticky notes NBm-n generated in the notebook NB in accordance with the conditions discretionarily designated by a user based on the type and attributes of each electronic sticky note, and to organize the electronic sticky notes NBm-n in such a manner that they are identifiable from electronic sticky notes NBm-n that are not grouped.

<Electronic Sticky Note Opening and Closing (Expanding/Folding) Process (FIG. 7)>

FIG. 10 is a diagram showing an operation of displaying in a case where the linked (connected) electronic sticky notes NB1-*n* are folded in accordance with an electronic sticky note opening/closing (expanding/folding) process of the information generation server 10.

In accordance with the foregoing electronic sticky note grouping process (in a notebook; FIG. 6), for example, in the display state of the notebook window G2 in which the plurality of electronic sticky notes NB1-1 and NB1-2 generated in the notebook NB1 are linked (connected) with a linking arrow Bs (step Q1) as shown in FIG. 8(C), if the [Fold] tab FT added to the left edge of the top electronic sticky notes NB1 is touch-operated (Yes in step Q2), the control unit 11 causes the electronic sticky notes NB1-1 and NB1-2 displayed in an expanded state to be folded in such a manner that the top electronic sticky note NB1-1 and the second electronic sticky notes NB1-2 and thereafter are stacked in a cascading manner, as shown in FIG. 10 (step Q3).

The control unit 11 updates the connection opening/closing flag of the sticky note management table (12*d*) (see FIG. 3) in accordance with the folded and displayed electronic sticky notes NB1-1 and NB1-2 (step Q4).

Thus, even in a case where the display is complicated due to the large number of electronic sticky notes NBm-n generated in the notebook NBn, it is possible for a user to display the electronic sticky notes NBm-n grouped by linking (connecting) in a folded state and to organize the electronic sticky notes in a simple notebook window G2.

The display mode in which the linked (connected) electronic sticky notes NB1-1 and NB1-2 are displayed in a folded state is not limited to a display mode in which electronic sticky notes NB1-*n* are stacked in the order in which they are linked, and a display mode in which the sticky notes may be aligned in a line in a vertical or horizontal direction in the order in which the sticky notes are linked may be adopted.

As shown in FIG. 10, after the [Expand] tab ET added to the left edge of the top electronic sticky note NB1 displayed in a folded state is touch-operated (Yes in step Q5), the control unit 11 causes the second electronic sticky note NB1-2 and thereafter connected to the top electronic sticky note NB1 to be displayed in an expanded state as originally displayed based on the electronic sticky note management table (12*d*), as shown in FIG. 8(C) (step Q6).

The control unit 11 updates the connection opening/closing flag of the sticky note management table (12*d*) (see FIG. 3) in accordance with the electronic sticky notes NB1-1 and NB1-2 displayed in an expanded state (step Q4).

Thus, a user is able to cause the grouped electronic sticky notes NBm-n organized and displayed in a folded state in the notebook NBm to be expanded as needed, so that the user can easily check the content of each of the grouped electronic sticky notes NBm-n and the relationship therebetween.

In the foregoing electronic sticky note grouping process (FIG. 6), the automatically grouped electronic sticky notes NBm-n are displayed in an expanded state at first as shown in FIG. 8(C); however, the notes may be displayed in a folded state at first as shown in FIG. 10, and the folded state may be changed to an expanded state in accordance with a touch operation to the [Expand] tab ET.

<Electronic Sticky Note Grouping Process (between multiple Notebooks; FIG. 11)>

FIG. 11 is a flowchart of the electronic sticky note grouping process between a plurality of notebooks in accordance with the server control program 12*a* of the information generation server 10.

FIG. 12 is a diagram showing an operation of displaying electronic sticky notes in a case where the automatic [Link] button ALB on the notebook list window G1 is operated in accordance with the electronic sticky note grouping process between a plurality of notebooks in the information generation server 10.

In the information generation server 10, a plurality of notebooks NBm (herein, NB1 through NB3) (a plurality of groups) generated in accordance with a user's operation are caused to be displayed on the touch-screen display unit 27 of the user terminal 20 as the notebook list window G1 listing the notebook icons (NB1 through NB3) as shown in FIG. 12 (step T21).

In the display state of the notebook list window G1, in response to a determination that there is more than one notebook NBm (the number of notebooks >1) (Yes in step T22), the control unit 11 causes a checkbox CB for a user to select a notebook NBm targeted for the electronic sticky note grouping processing to be displayed in each of the notebook icons (NB1 through NB3) (step T23).

The control unit 11 causes a checkmark indicative that the notebook NBm has been selected to be displayed or removed in accordance with a user's operation on the checkbox CB in each of the notebook icons (NB1 through NB3) (step T24).

If a user wishes to group the electronic sticky notes NB1-*n* through NB2-*n* in a plurality of notebooks (herein, NB1 and NB2) selected by a checkmark displayed in the notebook list window G1 (FIG. 12) by automatically linking (connecting) based on the sticky note information including the types and attributes stored in the sticky note management table (12*d*), in response to a touch-operation of the automatic [Link] button ALB provided in the notebook list window G1 (Yes in step T25), the control unit 11 acquires from the sticky note management table (12*d*) information of the types of the electronic sticky notes NB1-*n* through NB2-*n* included in the notebooks NB1 and NB2 indicated as being selected by the checkmark (step T26).

The control unit 11 causes the linking setting menu LM to be displayed in association with the automatic [Link] button ALB as shown in FIG. 12 based on the information of the types of the electronic sticky notes NB1-*n* through NB2-*n* acquired in step T26 (step T27).

FIG. 13 is an example of a display of the notebook window G2 of the notebook NB1 and the notebook window G2 of the notebook NB2 which are selected as a target of the electronic sticky note grouping process between a plurality of notebooks.

Herein, as shown in the notebook window G2 of FIG. 13(A), for example, suppose the notebook NB1 includes a total of five electronic sticky notes NB1-1 through NB1-5, namely three electronic sticky notes NB1-1, NB1-2, and NB1-3 generated by inputting discretionarily selected text based on an operation of the [Text] button Tx, an electronic sticky note NB1-4 generated by inputting a discretionarily selected photograph image based on an operation of the [Camera] button Ca, and the electronic sticky note NB1-5 generated by inputting discretionarily selected mathematical data based on an operation of the [Mathematical tool] button Ma.

As shown in the notebook window G2 of FIG. 13(B), for example, suppose the notebook NB2 includes a total of three electronic sticky notes NB2-1 through NB2-3, namely an electronic sticky note NB2-1 generated by inputting discretionarily selected text based on an operation of the [Text] button Tx, an electronic sticky note NB2-2 generated by inputting a discretionarily selected Web page based on an operation of the [Link] button Li, and the electronic sticky note NB2-3 generated by inputting discretionarily selected mathematical data based on operation of the [Mathematical tool] button Ma.

The display of the types of information, except for "text", "camera", "link" and "mathematical tool", included in the select item [Types] of the linking setting menu LM shown in FIG. 12 may be grayed out (disabled), so that they cannot be designated or removed based on the information of the types of the electronic sticky notes NB1-1 through NB1-5 and NB2-1 through NB2-3 included in the user's selected notebooks NB1 and NB2, which is acquired in step T26 (step T27).

The control unit 11 causes a checkmark indicating a designated condition to be displayed in accordance with a user's operation to each select item ([Time-series], [Types], [Number of linked]) of the linking setting menu LM (step T28).

Thereafter, after the [OK] button of the linking setting menu LM is operated and organizing of electronic sticky notes is instructed (Yes in step T29), the control unit 11 acquires the conditions for linking (connecting) in accordance with a display state of the checkmark in each select item in the linking setting menu LM (step T30), and the linking setting menu LM is removed from the notebook list window G1 (step T31).

Herein, as shown in the linking setting menu LM of FIG. 12, as the conditions for linking (connecting), suppose "chronological order" for [Time-series], "text" for [Types], and "all" for [Number of linked] are acquired.

FIG. 14 shows an example of a display of the notebook window G2 of the notebook NB1 and the notebook list window G2 of the notebook NB2 in a case where the grouping process is performed in accordance with the conditions for linking (connecting) that are set in the linking setting menu LM shown in FIG. 12, which targets a total of eight electronic sticky notes NB1-1 through NB1-5 and NB2-1 through NB2-3 included in two notebooks NB1 and NB2 shown in FIG. 13.

Targeting all electronic sticky notes NB1-1 through NB1-5 and NB2-1 through NB2-3 in two notebooks NB1 and NB2, the control unit 11 displays a sequence of the electronic sticky notes NB1-1, NB2-1, NB1-2, NB1-3 classified in accordance with the conditions for linking (connecting) acquired in step T30 ("chronological order", "text", "all") by connecting (linking) them with a red dotted-line linking arrow Rd and a blue solid-line linking arrow Bs from the connection source to the connection destination as shown in FIG. 14(A) based on the types of information and attributes (herein, date and time of creation/edit) stored in the electronic sticky note management table (12*d*) (step T32).

In this case, the control unit 11 causes the notebook window G2 of the notebook NB1 that includes the top electronic sticky note NB1-1 of the plurality of electronic sticky notes NB1-1, NB2-1, NB1-2, and NB1-3 grouped by linking (connecting) to be displayed with priority as shown in FIG. 14(A), and also causes a duplicate of the electronic sticky note NB2-1 that is included in the notebook NB2 differing from the prioritized notebook NB1 to be displayed in a vacant area in the notebook window G2 or in an area other than the grouped electronic sticky notes NB1-1, NB1-2, and NB1-3.

Then, the electronic sticky notes NB1-1, NB2-1, and NB1-2 grouped across notebooks NB1 and NB2 are displayed being connected (linked) by a red dotted-line linking arrow Rd, which represents such grouping, and the electronic sticky notes NB1-2 and NB1-3 grouped within the same notebook NB1, which are currently displayed, are connected (linked) by a blue solid-line linking arrow Bs, which indicates the relationship (step T32).

The control unit 11 updates the connection opening/closing flag and connected sticky note IDs of the sticky note management table (12*d*) based on the connected (linked) electronic sticky notes NB1-1, NB2-1, NB1-2, and NB1-3 included in the notebooks NB1 and NB2 (step T33).

In this case, the duplication of the electronic sticky note NB2-1 in the notebook NB2 (the second group) in contrast to the notebook NB1 (the first group) is achieved by either a process of duplicating management information of the electronic sticky note (duplicate electronic sticky note) NB2-1 stored in the sticky note management table (notebook management table) (12*d*) corresponding to the other notebook NB2 (the second group) and stored the duplicate management information as management information corresponding to the notebook NB1 (the first group) ("duplicate storing process") or a process of causing the electronic sticky note (duplicate electronic sticky note) NB2-1 of the notebook NB2 (the second group) to be displayed in a display area of the notebook NB1 (the first group) based on the management information of the electronic sticky note (duplicate electronic sticky note) NB2-1 stored in the sticky note management table (notebook management table (12*d*) corresponding to the notebook NB2 (the second group), without performing the duplicate storing process ("duplicate display process").

It is thus possible for a user to automatically connect (link) and group the electronic sticky notes NB1-1 through NB1-5 and NB2-1 through NB2-3 generated in discretionarily selected notebooks NB1 and NB2 in accordance with the conditions discretionarily designated by a user based on the type and attributes of each of these electronic sticky notes, and to organize the electronic sticky notes in such a manner that they are identifiable from non-grouped electronic sticky notes NBm-n.

In the notebook list window G1 (FIG. 12), through the user's operation of the checkbox CB, in a case where only one notebook NBm is selected and making a plurality of electronic sticky notes connected across a plurality of notebooks is not designated, and the process of automatic linking (connecting) is performed on the electronic sticky notes NBm-n in the selected notebook NBm, similarly to the aforementioned electronic sticky note grouping process (in a notebook; see FIG. 6) (step T25 through step T33).

As shown in FIG. 14(A), in the notebook window G2 of the notebook NB1 displayed with a priority in response to a performance of the electronic sticky note grouping process between multiple notebooks, upon a touch operation of the [Notebook move] tab NT that identifiably displays electronic sticky note NB2-1 (duplicate electronic sticky note) of the other notebook NB2 (Yes in T34), the control unit 11 causes the notebook window G2 of the notebook NB2 including the electronic sticky notes NB2-1 in which the [Notebook move] tab NT is operated to be displayed with priority as shown in FIG. 14(B) (step T35).

In this case, the control unit 11 duplicates, among the grouped electronic sticky notes NB1-1, NB2-1, NB1-2, and NB1-3, the electronic sticky notes NB-1, NB1-2, and NB1-3 included in the notebook differing from the notebook NB2 displayed with a priority, and causes the duplicate in a vacant area in the notebook window G2 in the notebook NB1 or an area other than the grouped electronic sticky note NB2-1.

Then, the electronic sticky notes NB1-1, NB2-1, and NB1-2 grouped across the notebooks NB1 and NB2 are displayed being connected (linked) by a red dotted-line linking arrow Rd, which represents such grouping, and the electronic sticky notes NB1-2 and NB1-3 grouped within the notebook NB1, which differs from the notebook NB2 displayed with a priority, are connected (linked) by a blue dotted-line linking arrow Bd, which indicates the relationship (step T35).

Similarly, as shown in FIG. 14(B), in the notebook window G2 of the notebook NB2 displayed with a priority, upon a touch operation of the [Notebook move] tab NT added on the right edge of the electronic sticky note NB1-1 (duplicate electronic sticky note) of the notebook NB1 duplicated as a result of grouping (Yes in step T34), the control unit 11 causes the notebook window G2 of the notebook NB1 including the electronic sticky notes NB1-1 in which the [Notebook move] tab NT is operated to be displayed with priority as shown in FIG. 14(A) (step T35).

It is thus possible for a user to selectively display the electronic sticky notes NB1-1 through NB1-5 and NB2-1 through NB2-3 included in discretionarily selected notebooks NB1 and NB2 as the notebook window G2 of the selected notebook NB1 or NB2 with priority to check the connected (grouped) state of the electronic sticky notes NB1-1, NB2-1, NB1-2, and NB1-3 that are automatically connected and grouped in accordance with discretionarily selected conditions.

FIG. 15 shows an example of a display indicating the notebook list window G1 in which the linking setting menu LM in a case where the grouping process is performed a second time with a change of the conditions for linking (connecting) after the electronic sticky notes grouping process between the plurality of notebooks as shown in FIG. 14 is performed.

FIG. 16 shows an example of a display indicating the notebook window G2 of the notebooks NB1 and NB2 in a case where the grouping process is performed a second time under the changed conditions for linking (connecting) that are set in the linking setting menu LM shown in FIG. 15 for the target of two notebooks NB1 and NB2 which have been subjected to the electronic sticky notes grouping process between the plurality of notebooks as shown in FIG. 14.

The procedures of the electronic sticky note grouping process performed a second time are the same as those explained earlier with reference to the flowchart of FIG. 11; therefore, the difference depending on the change in the conditions for linking (connecting) will be mainly explained hereinafter and the other matters will be explained only briefly.

As shown in FIG. 15, with the notebook list window G1 listing a plurality of icons of notebooks (NB1 through NB3) being displayed on the touch-screen display unit 27 of the user terminal 20 (step T21), the control unit 11 causes a checkmark to be displayed in accordance with a user's operation of a checkbox CB in the notebook icons (NB1, NB2) (steps T22 through T24).

After the automatic [Link] button ALB arranged on the notebook list window G1 is touch-operated (Yes in step T25), the control unit 11 acquires information of types of the electronic sticky notes NB1-*n* through NB2-*n* included in the selected notebooks NB1 and NB2 (step T26), and causes the linking setting menu LM to be displayed (step T27).

The control unit 11 causes a checkmark indicative of a designated condition to be displayed in accordance with a user's operation of each select item ([Time-series], [Type], [Number of linked]) of the linking setting menu LM (step T28), and after the [OK] button of the linking setting menu LM is touch-operated and the organizing of electronic sticky notes is instructed (Yes in step T29), the control unit 11 acquires the conditions for linking (connecting) in accordance with a display state of the checkmark in each select item in the linking setting menu LM (step T30), and the linking setting menu LM is removed (step T31).

Herein, suppose that the conditions for linking (connecting) in the grouping process performed a second time are changed by adding "link" as [Type] to the conditions in the first grouping process (see FIG. 12, "chronological order" as [Time-series], "text" as [Type], and "all" as [Number of linked]).

Targeting all electronic sticky notes NB1-1 through NB1-5 and NB2-1 through NB2-3 in the notebooks NB1 and NB2, the control unit 11 displays a sequence of the electronic sticky notes NB1-1 "text", NB2-1 "text", NB1-2 "text", NB1-3 "text", and NB2-2 "link" classified in accordance with the conditions for linking (connecting) acquired in step T30 ("chronological order", "text", "link", "all") by connecting (linking) them with a red dotted-line linking arrow Rd and a blue solid-line linking arrow Bs from the connection source to the connection destination as shown in FIG. 16(A) based on the types of information and attributes (herein, a date and time of creation/edit) stored in the electronic sticky note management table (12*d*) (step T32).

In this case, the control unit 11 causes the notebook window G2 of the notebook NB1 to be displayed with priority as shown in FIG. 16(A), and also causes a duplicate of the electronic sticky note NB2-1 that is included in the notebook NB2 differing from the prioritized notebook NB1 to be displayed in a vacant area in the notebook window G2 or in an area other than the grouped electronic sticky notes NB1-1, NB1-2, and NB1-3.

Then, the electronic sticky notes NB1-1, NB2-1, and NB1-2 grouped across notebooks NB1 and NB2 and the electronic sticky notes NB1-3 and NB2-2 linked (connected) as a result of second-time grouping are displayed being respectively connected (linked) by a red dotted-line linking arrow Rd, which represents such grouping, and the electronic sticky notes NB1-2 and NB1-3 grouped within the same notebook NB1, which are currently displayed, are connected (linked) by a blue solid-line linking arrow Bs, which indicates the relationship (step T32).

The control unit 11 updates the connection opening/closing flag and connected sticky note IDs of the sticky note management table (12*d*) based on the connected (linked) electronic sticky notes NB1-1, NB2-1, NB1-2, NB1-3, and NB2-2 included in the notebooks NB1 and NB2 (step T33).

It is thereby possible for a user to organize, by automatically connecting (linking) based on newly designated conditions for linking (connecting), all electronic sticky notes NB1-1 through NB1-5 and NB2-1 through NB2-3 including the electronic sticky notes NB1-1, NB2-1, NB1-2, and NB1-3 that have already been grouped as a result of a grouping process performed in the past on the discretionarily selected notebooks NB1 and NB2.

Similarly to the foregoing case, in the notebook window G2 of the notebook NB1 displayed with priority as shown in FIG. 16(A), after the [Notebook move] tab NT added on the right edge of the electronic sticky note NB1-1 (duplicate electronic sticky note) of the notebook NB1 duplicated as a result of grouping is operated by touch (Yes in step T34), the control unit 11 causes the notebook window G2 of the notebook NB2 including the electronic sticky note NB2-1 or NB2-2 in which the [Notebook move] tab NT is operated to be displayed with priority as shown in FIG. 16(B) (step T35).

The control unit 11 duplicates, among the grouped electronic sticky notes NB1-1, NB2-1, NB1-2, NB1-3, and NB2-2, the electronic sticky notes NB1-1, NB1-2, and NB1-3 included in the notebook differing from the notebook NB2 displayed with a priority, and causes the duplicate in a vacant area in the notebook window G2 in the notebook NB1 or an area other than the grouped electronic sticky note NB2-1.

Then, the electronic sticky notes NB1-1, NB2-1, and NB1-2 grouped across notebooks NB1 and NB2 and the electronic sticky notes NB1-3 and NB2-2 linked (connected) as a result of second-time grouping are displayed being respectively connected (linked) by a red dotted-line linking arrow Rd, which represents such grouping, and the electronic sticky notes NB1-2 and NB1-3 grouped within the same notebook NB1, which differs from the notebook NB2 displayed with priority, are connected (linked) by a blue dotted-line linking arrow Bd, which indicates the relationship (step T35).

Summary of Embodiment

According to the information generation server 10 (information generation apparatus) of the embodiment, in response to a touch-operation of the automatic [Link] button ALB in the notebook window G2 of the notebook NB1 in which a plurality of electronic sticky notes (NB1-1 through NB1-3 in FIG. 1) are generated and displayed, the linking selecting menu LM (FIG. 9) is displayed. Then, the plurality of electronic sticky notes (NB1-1 through NB1-2 in FIG. 1) are classified according to the linking conditions (organizing conditions), including types of information of the electronic sticky notes designated using the linking setting menu LM, and are organized and displayed by automatically connecting the notes by a blue solid-line linking arrow Bs, which indicates that the notes originate from the same notebook NB1.

It is thus possible to organize and display a plurality of electronic sticky notes NBm-n in the display area (notebook NBm) with a simple operation.

According to the information generation server 10 (information generation apparatus) of the present embodiment, a touch operation of the automatic [Link] button ALB causes the linking setting menu LM to be displayed (FIG. 12) on the notebook (group) list window G1 (FIG. 12) listing the plurality of notebooks (groups) NB1 through NB3. Then, in accordance with the linking conditions (designated conditions), including types of information of the electronic sticky notes designated using the linking setting menu LM, a plurality of electronic sticky notes (NB1-1, NB2-1, NB1-2, NB1-3 in FIG. 13) included in notebooks NB1 and NB2 discretionarily selected from the notebook list (G1), and the electronic sticky notes (from NB1-1 to NB2-1, and from NB2-1 to NB1-2) across the notebooks (groups) NB1 and NB2 are automatically connected by a red dotted-line linking arrow Rd (FIG. 14), and the electronic sticky notes (from NB1-2 to NB1-3) in the notebook (group) NB1 displayed in priority are automatically connected with a blue solid-line linking arrow Bs (FIG. 14(A)), and the electronic sticky notes of the notebook (group) NB1) differing from the prioritized notebook (group) NB2 are automatically connected with a blue dotted-line linking arrow Bd (FIG. 14(B)).

It is therefore possible to display a relationship between a plurality of electronic sticky notes NB1-*n*, NB2-*n* with a simple operation, even in a case where the sticky notes are those generated across different display areas (notebooks NB1, NB2).

In the foregoing embodiment, if a plurality of electronic sticky notes NB1-*n* and NB2-*n* included in the notebooks NB1 and NB2 are grouped, the electronic sticky notes (from NB1-1 to NB2-1, and from NB2-1 to NB1-2) linked across the notebooks NB1 and NB2 by a red dotted-line linking arrow Rd are displayed, the electronic sticky notes (from NB1-2 to NB1-3) in the notebook NB1 displayed with priority linked by a blue solid-line linking arrow Bs are displayed, and the electronic sticky notes (from NB1-2 to NB1-3) in the notebook NB1 differing from the prioritized notebook NB2 linked by a blue dotted-line linking arrow Bd are displayed. On the other hand, if there are three or more notebooks NBm targeted for grouping, it is possible to show in an easy-to-understand manner the relationships between the electronic sticky notes grouped across three or more notebooks NB1, NB2, NB3 in the notebook NBm displayed with priority, by adding a dotted-line linking arrow and a solid-line linking arrow in colors other than red and blue.

For example, if there are a plurality of groups of electronic sticky notes classified by different sets of designated linking conditions, the groups may be identified by linking arrows in different colors that each connect the electronic sticky notes within the same group.

As select items, [Time-series], [Type], [Number of linked] are provided in the linking setting menu LM of the foregoing embodiment. For example, [Attributes] may also be provided so that the attribute of the information that is input to each electronic sticky note NBm-n stored in association with an electronic sticky note ID of the sticky note management table (12*d*) may be added as a condition and the electronic sticky notes may be classified (grouped) according to attributes.

Specifically, if the type of information of the electronic sticky note NBm-n is “text”, the attributes thereof may include sub-attributes, such as data setting information, for example a size, thickness, color of characters and the number of characters, and a importance level, and so on. If the type of the information of the electronic sticky note NBm-n is “camera”, the attribute of the type may include sub-attributes such as “text book”, “reference book”, and “notebook”, corresponding to a photograph image that has been taken. If the type of information of the electronic sticky note NBm-n is “link”, the attribute thereof may include sub-attributes, such as “search for XX” and “map of YY”, which are a search source of an input Web page. If the type of the information of the electronic sticky note NBm-n is “mathematical tool”, the attribute thereof may include sub-attributes corresponding to input mathematical data, such as “calculation”, “graph”, “geometry”, and “statistics”.

Such detailed attributes according to the information of the electronic sticky note NBm-n are stored in association with the electronic sticky note ID of the sticky note management table (12*d*) and [Attributes] is provided as a select item of the linking setting menu LM; thus, a plurality of electronic sticky notes may be classified according to the number of sub-attributes included in each attribute, the linking (connecting) method (color, thickness, and path of a linking arrow) may be changed in accordance with a size, thickness, color of characters in a piece of text and the number of characters in a piece of text, and the order in which the sticky notes are connected may be changed in accordance not only with a date and time of creation/edit, etc. but also with the number of characters, importance level of the text, and type of information of the text.

In the foregoing embodiment, the direction in which a plurality of electronic sticky notes connected in a sequence are aligned (organized) is not limited to a horizontal direction as shown in FIGS. 8, 14, and 16, and may be a vertical direction.

In the foregoing embodiment, as a method of connecting and organizing electronic sticky notes, multiple organizing methods other than a method of connecting and organizing sticky notes in a sequence, a method of connecting and organizing sticky notes with room for multiple branches of a sequence, a connecting and organizing method for grouping a plurality of electronic sticky notes regardless of the order, may be adoptable, and even multiple organizing methods may be selected.

For example, if there is no need to recognize the order of multiple electronic sticky notes belonging to the same group, lines that connect the electronic sticky notes in a star shape, a ring shape, or a branching shape may be displayed.

Furthermore, if a plurality of electronic sticky notes belonging to the same group are displayed being associated to each other, they may be displayed identifiably from the sticky notes in a different group by a method of aligning the vertical or horizontal display positions of the sticky notes, instead of displaying lines connecting the sticky notes.

The method of each of the processes performed by the information generation system 1 described in the foregoing embodiments, namely the electronic sticky note generation process shown in the flowchart of FIG. 5, the electronic sticky note grouping process in a notebook as shown in the flowchart of FIG. 6, the electronic sticky note opening and closing (expanding/folding) process shown in the flowchart of FIG. 7, and the electronic sticky note grouping process between notebooks as shown in the flowchart of FIG. 11, can be stored, as a computer-executable program, in a storage medium, such as a memory card (a ROM card or a RAM card), a magnetic disk (a floppy (registered trademark) disk, a hard disk, or the like), an optical disk (CD-ROM, DVD, or the like), and a semiconductor memory, and can be distributed. Furthermore, a computer (CPU) of an information processing apparatus (electronic device) reads the program stored in the medium of the external storage apparatus, and the operations can be executed and controlled based on the read programs, thereby realizing the various functions described in the embodiments, and executing processing similar to the above-described processes.

The data of the programs for realizing each of the processes can be transmitted on a communication network (N) in a form of program codes, and data of the programs is obtained from a computer apparatus (program server) connected to this communication network (N) and imported to an information processing apparatus (electronic device), and stored in a storage apparatus, thereby realizing the above-described functions.

The present invention is not limited to the embodiment and various modifications can be made without departing from the scope of the present invention in practical stages. The embodiments may be appropriately combined and, in that case, combined advantages can be attained. In addition, the embodiments include inventions of various stages, and a variety of inventions can be derived by properly combining structural elements of one embodiment or by properly combining structural elements of different embodiments. For example, if the object of the invention is achieved and the advantages of the invention are attained even after some of the structural elements disclosed in connection with the embodiments are deleted, the structure made up of the resultant structural elements can be extracted as an invention.

What is claimed is:

1. An information generation apparatus comprising a control unit configured to perform:

a generation process of generating, in response to a user’s operation, an electronic sticky note included in each of a plurality of groups that have different display areas;

a correlating process of correlating a plurality of electronic sticky notes that satisfy a designated condition to each other among a plurality of electronic sticky notes displayed in a display area of a designated group, and displaying the correlated electronic sticky notes; and a control process of, in a case where the correlating process is performed on a first group of the plurality of groups, if an electronic sticky note that satisfies the designated condition is included in a second group differing from the first group, causing a duplicate electronic sticky note obtained by duplicating the electronic sticky note that satisfies the designated condition included in the second group to be displayed in a display area of the first group, and correlating the plurality of electronic sticky notes, including the duplicate electronic sticky note, that satisfy the designated condition to each other, wherein the control unit is configured to perform, as the correlating process, a connecting process of displaying lines that connect the plurality of electronic sticky notes that satisfy the designated condition to each other, and wherein the control unit is configured to:

cause a user to designate whether to make a plurality of electronic sticky notes connected across a plurality of groups, and perform, if connecting a plurality of electronic sticky notes across a plurality of groups is designated in a case where the connecting process is performed, a process of displaying a line connecting a plurality of electronic sticky notes that satisfy the designated condition including the duplicate electronic sticky note to each other, and perform, if connecting a plurality of electronic sticky notes across a plurality of groups is not designated in a case where the connecting process is performed, a process of displaying a line connecting a plurality of electronic sticky notes, not including the duplicate electronic sticky note, that satisfy the designated condition to each other.

2. The information generation apparatus according to claim 1, wherein the control unit is configured to manage a plurality of electronic sticky notes included in each of the groups as a notebook that stores management information of electronic sticky notes included in each group and in which the stored management information can be updated, and duplication of the electronic sticky notes is performed by either a duplicate storing process of duplicating management information of electronic sticky notes stored in a notebook of the second group and causing the duplicate to be stored in a notebook of the first group, or a duplicate displaying process of causing an electronic sticky note of the second group to be displayed in a display area of the first group based on management information of the electronic sticky note stored in the notebook of the second group without performing the duplicate storing process.

3. The information generation apparatus according to claim 1, wherein the control unit performs a process of causing the duplicate electronic sticky note to be displayed in such a manner that the duplicate electronic sticky note can be identified as a duplicate.

4. The information generation apparatus according to claim 1, wherein if there is a user's operation relating to the duplicate electronic sticky note while a display area of the first group that includes the duplicate electronic sticky note is displayed with priority, the control unit performs a process of causing a display area of the second group that includes a duplicate-source electronic sticky note to be displayed with priority.

5. The information generation apparatus according to claim 1, wherein a plurality of types of information are input to the plurality of electronic sticky notes respectively, the control unit is configured to:

receive, in response to a user's operation, a designated condition for connecting the plurality of electronic sticky notes, the designated condition including a first condition including designation of a type of information that is input to an electronic sticky note; and perform, in response to a user's operation instructing organizing the plurality of electronic sticky notes in accordance with the designated condition, a process of organizing and displaying the plurality of electronic sticky notes connected by the first condition in such a manner that the electronic sticky notes are identifiable from the other electronic sticky notes not connected in the display area of the first group.

6. The information generation apparatus according to claim 5, wherein the control unit is configured to:

perform, in response to a user's operation instructing organizing the electronic sticky notes in accordance with the designated conditions, a process of organizing and displaying the plurality of electronic sticky notes in any one of a plurality of states that includes a first identification state in which a line connecting the plurality of electronic sticky notes that satisfy the first condition is displayed without changing display positions of the electronic sticky notes displayed at positions designated by a user's operation, and a second identification state in which the display positions of the plurality of electronic sticky notes that satisfy the first condition are moved from the positions designated by the user's operation and the electronic sticky notes are displayed within a predetermined range determined within a display area of the first group.

7. The information generation apparatus according to claim 6, wherein the control unit is configured to perform a process of displaying the electronic sticky notes, switching between the first identification state and the second identification state in accordance with a user's operation.

8. The information generation apparatus according to claim 6, wherein the control unit performs a process of causing the electronic sticky notes to be displayed in the second identification state in accordance with a user's operation instructing organizing the electronic sticky notes in accordance with the designated condition, and then causing the electronic sticky notes to be displayed in the first identification state in accordance with a user's operation that is input after the display in the second identification state.

9. The information generation apparatus according to claim 6, wherein the control unit performs a process of receiving designated conditions including a second condition for designating an order in which the plurality of electronic sticky notes are connected, and causing a line connecting the plurality of electronic sticky notes in the designated order to be displayed in the first identification state.

10. The information generation apparatus according to claim 9, wherein attribute information that includes time and date information indicating time and date of creation or edit is added to the electronic sticky note, and the second condition is a condition that designates an order in which the electronic sticky notes are connected in accordance with the attribute information.

11. The information generation apparatus according to claim 10, wherein the control unit performs a process of connecting the plurality of electronic sticky notes in accordance with the number of electronic sticky notes to which the attribute information is added.

12. The information generation apparatus according to claim 10, wherein the control unit performs a process of displaying a select item for selecting content of attribute information added to the electronic sticky note in accordance with a user's operation and receiving the second condition based on the select item in response to a user's operation.

13. The information generation apparatus according to claim 9, wherein the control unit connects the plurality of electronic sticky notes under the first condition that designates a type of information, the second condition that designates an order in which the sticky notes are connected, and a third condition that designates the number of electronic sticky notes to be connected.

14. The information generation apparatus according to claim 6, wherein the second identification state is a state in which the connected electronic sticky notes are stacked in a cascading manner.

15. The information generation apparatus according to claim 1, wherein a plurality of types of information include text, attribute information that includes content of the text is added to the electronic sticky note, and the control unit performs a process of connecting the plurality of electronic sticky notes in accordance with the content of the text.

16. The information generation apparatus according to claim 15, wherein the control unit performs a process of changing a method of connecting a line that connects the plurality of electronic sticky notes in accordance with content of the text.

17. An information generation method executed by an information generation apparatus, the method comprising:

a generation process of generating, in response to a user's operation, an electronic sticky note included in each of a plurality of groups that have different display areas;

a correlating process of correlating a plurality of electronic sticky notes that satisfy a designated condition to each other among a plurality of electronic sticky notes displayed in a display area of a designated group, and displaying the correlated electronic sticky notes;

a control process of, in a case where the correlating process is performed on a first group of the plurality of groups, if an electronic sticky note that satisfies the designated condition is included in a second group differing from the first group, causing a duplicate electronic sticky note obtained by duplicating an electronic sticky note that satisfies the designated condition included in the second group to be displayed in a display area of the first group, and correlating the plurality of electronic sticky notes, including the duplicate electronic sticky note, that satisfy the designated condition to each other, wherein the correlating process comprises a connecting process of displaying lines that connect the plurality of electronic sticky notes that satisfy the designated condition to each other, and wherein the method further comprises:

causing a user to designate whether to make a plurality of electronic sticky notes connected across a plurality of groups, and performing, if connecting a plurality of electronic sticky notes across a plurality of groups is designated in a case where the connecting process is performed, a process of displaying a line connecting a plurality of electronic sticky notes that satisfy the designated condition including the duplicate electronic sticky note to each other, and performing, if connecting a plurality of electronic sticky notes across a plurality of groups is not designated in a case where the connecting process is performed, a process of displaying a line connecting a plurality of electronic sticky notes, not including the duplicate electronic sticky note, that satisfy the designated condition to each other.

18. A non-transitory storage medium storing a program for causing a control unit of an information generation apparatus to perform functions comprising:

a generation process of generating an electronic sticky note included in each of a plurality of groups in accordance with a user's operation, the groups having different display areas;

a correlating process of correlating a plurality of electronic sticky notes that satisfy a designated condition to each other among a plurality of electronic sticky notes displayed in a display area of a designated group, and displaying the correlated electronic sticky notes;

a control process of, in a case where the correlating process is performed on a first group of the plurality of groups, if an electronic sticky note that satisfies the designated condition is included in a second group differing from the first group, causing a duplicate electronic sticky note obtained by duplicating an electronic sticky note that satisfies the designated condition included in the second group to be displayed in a display area of the first group, and correlating the plurality of electronic sticky notes, including the duplicate electronic sticky note, that satisfy the designated condition to each other, wherein the correlating process comprises a connecting process of displaying lines that connect the plurality of electronic sticky notes that satisfy the designated condition to each other, and wherein the functions further comprise:

causing a user to designate whether to make a plurality of electronic sticky notes connected across a plurality of groups, and performing, if connecting a plurality of electronic sticky notes across a plurality of groups is designated in a case where the connecting process is performed, a process of displaying a line connecting a plurality of electronic sticky notes that satisfy the designated condition including the duplicate electronic sticky note to each other, and performing, if connecting a plurality of electronic sticky notes across a plurality of groups is not designated in a case where the connecting process is performed, a process of displaying a line connecting a plurality of electronic sticky notes, not including the duplicate electronic sticky note, that satisfy the designated condition to each other.

* * * * *